(12) United States Patent
Pang et al.

(10) Patent No.: US 11,586,028 B2
(45) Date of Patent: Feb. 21, 2023

(54) MOBILE PHONE-BASED MINIATURE MICROSCOPIC IMAGE ACQUISITION DEVICE AND IMAGE STITCHING AND RECOGNITION METHODS

(71) Applicant: WUHAN LANDING INTELLIGENCE MEDICAL CO., LTD., Wuhan (CN)

(72) Inventors: Baochuan Pang, Wuhan (CN); Qiang Luo, Wuhan (CN); Xiaorong Sun, Wuhan (CN); Jian Wang, Wuhan (CN); Dehua Cao, Wuhan (CN)

(73) Assignee: WUHAN LANDING INTELLIGENCE MEDICAL CO., LTD.

( * ) Notice: Subject to any disclaimer, the term of this patent is extended or adjusted under 35 U.S.C. 154(b) by 0 days.

(21) Appl. No.: 16/636,339

(22) PCT Filed: Dec. 25, 2019

(86) PCT No.: PCT/CN2019/128225
§ 371 (c)(1),
(2) Date: Feb. 4, 2020

(87) PCT Pub. No.: WO2021/093109
PCT Pub. Date: May 20, 2021

(65) Prior Publication Data
US 2022/0269060 A1 Aug. 25, 2022

(30) Foreign Application Priority Data

Nov. 14, 2019 (CN) .......................... 201911112866.0

(51) Int. Cl.
*G02B 21/36* (2006.01)
*G06T 7/136* (2017.01)
(Continued)

(52) U.S. Cl.
CPC ......... *G02B 21/362* (2013.01); *G02B 21/008* (2013.01); *G02B 21/0036* (2013.01);
(Continued)

(58) Field of Classification Search
None
See application file for complete search history.

(56) References Cited

U.S. PATENT DOCUMENTS

2011/0181947 A1  7/2011  Yang

FOREIGN PATENT DOCUMENTS

CN  203178562 U  4/2013
CN  104796589 A  7/2015
(Continued)

OTHER PUBLICATIONS

CNIPA, first office action, dated Jun. 11, 2020, Chinese application No. 201911112866.0.
(Continued)

*Primary Examiner* — James M Anderson, II

(57) ABSTRACT

A mobile phone-based miniature microscopic image acquisition device, and image stitching and recognition methods are provided. The acquisition device comprises a support, wherein a mobile phone fixing table is provided on the support. A microscope head is provided below a camera of a mobile phone. A slide holder is provided below the microscope head, and an lighting source is provided below the slide holder. A scanning movement is performed between the slide holder and the microscope head along X and Y axes, so that images of a slide are acquired into the mobile phone. The slide sample images acquired into the mobile phone can be stitched and recognized, and can be uploaded to the cloud to be processed by cloud AI, thereby significantly improving the accuracy and efficiency of cell recognition, greatly reducing the medical cost, and ensuring
(Continued)

more remote medical institutions can apply such technology for diagnosis.

10 Claims, 17 Drawing Sheets

(51) Int. Cl.
| | | |
|---|---|---|
| G06T 7/90 | (2017.01) | |
| G06V 20/69 | (2022.01) | |
| G06V 10/10 | (2022.01) | |
| G06V 10/94 | (2022.01) | |
| G06V 10/147 | (2022.01) | |
| G02B 21/00 | (2006.01) | |
| G06T 7/00 | (2017.01) | |
| H04N 5/225 | (2006.01) | |
| H04N 5/232 | (2006.01) | |

(52) U.S. Cl.
CPC ............ *G06T 7/0012* (2013.01); *G06T 7/136* (2017.01); *G06T 7/90* (2017.01); *G06V 10/147* (2022.01); *G06V 10/16* (2022.01); *G06V 10/95* (2022.01); *G06V 20/693* (2022.01); *G06V 20/695* (2022.01); *G06V 20/698* (2022.01); *H04N 5/2253* (2013.01); *H04N 5/2254* (2013.01); *H04N 5/2256* (2013.01); *H04N 5/23296* (2013.01); *G06T 2207/10024* (2013.01); *G06T 2207/10056* (2013.01); *G06T 2207/30024* (2013.01); *G06V 2201/03* (2022.01)

(56) References Cited

FOREIGN PATENT DOCUMENTS

| | | | | |
|---|---|---|---|---|
| CN | 205691853 U | | 11/2016 | |
| CN | 106226897 A | * | 12/2016 | ........... G02B 21/241 |
| CN | 106226897 A | | 12/2016 | |
| CN | 109599188 A | | 4/2019 | |
| CN | 109752835 A | * | 5/2019 | |
| CN | 109752835 A | | 5/2019 | |
| CN | 110160956 A | | 8/2019 | |
| CN | 210534819 U | | 5/2020 | |

OTHER PUBLICATIONS

CNIPA, Notification to Grant Patent Right for invention, dated Jul. 29, 2020, Chinese application No. 201911112866.0.
International Searching Authority, ISR, Aug. 6, 2020, PCT Application No. PCT/CN2019/128225.
Journal of Zhejiang wanli University, Wangli, et al., Flower Image Segmentation Algorithm Based on Lab Color Space, pp. 67-73, May 31, 2018.

* cited by examiner the cell images are scattered after software scanning images are automatically matched with relevant positions through a "visual field sub-block matching" algorithm since after the position matching is successful,
the positions of the cells will be slightly deviated the positions of the cells are accurately stitched
by a "visual field position fitting" algorithm

MOBILE PHONE-BASED MINIATURE MICROSCOPIC IMAGE ACQUISITION DEVICE AND IMAGE STITCHING AND RECOGNITION METHODS

FIELD

The present invention relates to the field of medical image acquisition, and more particularly, to a mobile phone-based miniature microscopic image acquisition device, and image stitching and recognition methods.

BACKGROUND

Cell and tissue section scanning is of important materials for disease diagnosis, scientific research, and teaching. A tissue section in a slide is scanned with a digital tissue section scanner and converted into a digital image for the sake of easy storage, transmission and remote diagnosis. However, the existing digital tissue section scanners are very expensive, about 500,000 Yuan each, for example, in the scheme described in Chinese patent document CN 107543792 A, which limits the popularization of diagnosis, scientific research and teaching methods for tissue sections. In order to solve this technical problem, some improved schemes are also adopted in the prior art to reduce equipment costs. The Chinese patent document CN 106226897 A describes a tissue section scanning device based on a common optical microscope and a smart phone, which is composed of a microscope holder, a common optical microscope, a smart phone, a focusing and section moving device, a smart phone holder and a computer. The functions of the smartphone, the computer, and the microscope are integrated to digitize tissue sections in a low-cost and convenient way. However, this structure is still large in volume, and thus inconvenient to move, and the price is still high. In addition, the optical path is relatively long, which affects the acquisition accuracy of patterns.

SUMMARY

The technical problem to be solved by the present invention is to provide a mobile phone-based miniature microscopic image acquisition device, and image stitching and recognition methods, which can greatly reduce the cost and the volume, and realize automatic scanning and acquisition, as well as stitching, recognition and cloud processing of graphics.

In order to solve the above technical problem, the technical solution adopted by the present invention is as follows: a mobile phone-based miniature microscopic image acquisition device comprises a support, wherein a mobile phone fixing table is provided on the support for fixing a mobile phone; a microscope head is provided below a camera of the mobile phone, a slide holder is provided below the microscope head, and a lighting source is provided below the slide holder; and a scanning movement is performed between the slide holder and the microscope head along X and Y axes, so that images of a slide are acquired into the mobile phone.

In a preferred solution, the microscope head comprises a cantilever rod mounted on the mobile phone fixing table, one end of the cantilever rod is fixedly connected to the mobile phone fixing table, and a microscope lens is provided on the other end of the cantilever rod; and the microphone lens is located below the camera of the mobile phone.

In a preferred solution, the mobile phone fixing table is provided with a sunken stage near the camera of the mobile phone, and the cantilever rod is fixedly connected to the sunken stage by a screw; the sunken stage is provided with at least one positioning pin, the tip of the cantilever rod is provided with a corresponding pin hole, and the positioning pin is slidably connected to the pin hole; the screw is in threaded connection with the cantilever rod; the tip of the screw props against the sunken stage; a distance between the cantilever rod and the sunken stage is adjusted by the rotation of the screw; and the microscope lens is a replaceable microscope lens.

In a preferred solution, positioning blocks are provided on both sides of the mobile phone fixing table, and are connected to the mobile phone fixing table through fixing screws; and the opposite surfaces of the two positioning blocks are inclined surfaces, and each of the positioning blocks has a wider top and a narrower bottom so as to lock the mobile phone by means of the inclined surfaces.

In a preferred solution, a magnetic attraction block is provided on the surface of the mobile phone fixing table; or a positioning block is provided on at least one side of the mobile phone fixing table, and meanwhile a magnetic attraction block is provided on the surface of the mobile phone fixing table; or a positioning block is provided on at least one side of the mobile phone fixing table, and a silicone friction plate is provided on the surface of the mobile phone fixing table.

In a preferred solution, the slide holder is provided on a scanning mechanism running along the X and Y axes; an X-axis guide rail is fixedly provided on the support, and an X-axis slider is slidably mounted on the X-axis guide rail; an X-axis drive nut is fixedly provided on the X-axis slider; an X-axis drive motor is connected to an X-axis screw rod; the X-axis screw rod is in threaded connection with the X-axis drive nut, so that the X-axis drive motor drives the X-axis slider to reciprocate along the X-axis guide rail; a Y-axis guide rail is fixedly provided on the X-axis slider; the slide holder is slidably mounted on the Y-axis guide rail; a Y-axis drive nut is provided on the slide holder; a Y-axis drive motor is connected to a Y-axis screw rod; the Y-axis screw rod is in threaded connection with the Y-axis drive nut, so that the Y-axis drive motor drives the slide holder to reciprocate along the Y-axis guide rail; the mobile phone-based miniature microscopic image acquisition device is further provided with a control box, wherein the control box outputs a switch signal to be connected to the mobile phone to control the mobile phone to take pictures; and the control box outputs pulse signals to be connected to the X-axis drive motor and the Y-axis drive motor, respectively, to drive the X-axis drive motor and the Y-axis drive motor to rotate respectively.

In a preferred solution, the X-axis drive motor and the Y-axis drive motor are stepping motors; and the lighting source is an LED power source.

In a preferred solution, the mobile phone-based miniature microscopic image acquisition device comprises a visual field sub-block matching module, a visual field position fitting module, and a block extraction module, wherein the visual field sub-block matching module is configured to identify an overlapping region between every two adjacent images and determine an adjacent positional relationship between the sub-images, so that the sub-images acquired by a microscopic scanning device are automatically arranged in a stitching order of the images; the visual field position fitting module is configured to finely tune positions according to the overlapping region between every two adjacent sub-images, so that cell positions are accurately stitched;

the block extraction module is configured to automatically extract a completely stitched image; and the specific implementation steps are as follows:

S1: visual field sub-block matching: the visual field sub-block matching module is configured to identify an overlapping region between every two adjacent images and determine an adjacent positional relationship between the sub-images, so that the sub-images acquired by the microscopic scanning device are automatically arranged in a stitching order of the images;

S2: visual field position fitting: the visual field position fitting module is configured to finely tune positions according to the overlapping region between every two adjacent sub-images, so that cell positions are accurately stitched;

S3: block extraction: the block extraction module is configured to automatically extract a completely stitched image;

the operating process of the visual field sub-block matching in step S1 is as follows:

Sa01: inputting and initiating a result set M;

Sa02: setting the current visual field i as a first visual field;

Sa03: solving a set J of all adjacent visual fields of the current visual field i;

Sa04: setting the current adjacent visual field j as a first visual field in J;

Sa05: solving possible overlapping regions Ri and Rj of the visual field i and the visual field j;

Sa06: rasterizing a template region Ri into template sub-block sets Pi;

Sa07: sorting the template sub-block sets Pi in a descending order according to a dynamic range of the sub-blocks;

Sa08: setting the current template sub-block P as the first one in the template sub-block sets Pi;

Sa09: solving a possible overlapping region s of the template sub-block P in the visual field J;

Sa10: performing a template matching search by taking the template sub-block P as a template and s as a search region;

Sa11: adding a best match m to the result set M;

Sa12: finding all matching visual field sets N that are in consistent with m from the result set M;

Sa13: judging whether or not a weight in N is greater than a threshold v upon comparison; if not, setting the current template sub-block P as the next one in the template sub-block sets Pi and returning to Sa09; and if yes, proceeding to next step;

Sa14: judging whether or not the visual field j is the last visual field in the visual field set J upon comparison; if not, setting the visual field j as the next visual field in the visual field set J and returning to Sa05; and if yes, proceeding to next step;

Sa15: judging whether or not the visual field i is the last visual field upon comparison; if not, setting i as the next visual field and returning to Sa03; and if yes, outputting a result;

the process of visual field position fitting in step S2 is as follows:

Sa16: inputting and initializing all visual field positions Xi, Yi;

Sa17: setting the current visual field i as a first visual field;

Sa18: obtaining a matching subset Mi including the visual field i from the sub-block matching set M;

Sa19: recalculating the positions Xi and Yi of the visual field i according to the matching subset Mi;

Sa20: judging whether or not all visual field updates are completed; if not, setting the visual field i as the next visual field; and if yes, proceeding to next step;

Sa21: calculating an average deviation L between the current visual field position and the previous visual field position;

Sa22: judging whether or not the average deviation L is less than a threshold value 1 upon comparison; if not, returning to Sa17; and if yes, proceeding to next step;

Sa23: performing normalized adjustment on the visual field positions; outputting all the visual fields;

the process of block extraction in step S3 is as follows:

Sa24: extracting sizes W, H of a full graph;

Sa25: dividing the full graph into a set B of blocks according to the block sizes;

Sa26: calculating the positions of all blocks b in the set B;

Sa27: setting one of the blocks b as the first block in the set B;

Sa28: calculating a set Fb of all visual fields overlapping with the block b;

Sa29: setting a visual field f as the first visual field in Fb;

Sa30: solving the overlapping regions Rb and Rf of the visual field f and the block b;

Sa31: copying an image in Rf to Rb;

Sa32: judging whether or not the visual field f is the last visual field in the set Fb; if not, setting the visual field f as the next visual field in Fb and returning to Sa29; and if yes, proceeding to next step;

Sa33: saving an image of the block b;

Sa34: judging whether or not the block b is the last block in the set B; if not, setting the block b as a first block in the set B and returning to Sa28; and if yes, outputting a result.

In a preferred solution, the implementation steps are as follows:

S1: acquiring microscopic images;

S2: stitching a plurality of images of a single sample, and extracting according to cell nucleus features in the stitched image to obtain microscopic images of single cell nucleus;

S3: classifying the microscopic images of single cell nucleus according to the labeled cells by means of an artificial intelligence program subjected to model training; thereby obtaining sample-based classified cell data through the above steps;

the step of acquiring the microscopic image of single cell nucleus in step S2 is as follows:

S100: detecting features points of the cell nucleus: reducing each image to a plurality of different scales and extracting feature points respectively;

S101: performing preliminary screening, i.e., screening to remove similar feature points by using coordinates of the feature points, thereby reducing repeated extraction of cells;

S102: subdividing and segmenting according to a color difference threshold: converting a picture to a LAB format; and after the inversion of a B channel as well as the weighting and Otsu thresholding of an A channel, segmenting to obtain a cell nucleus mask map, wherein the weight is 0.7 for the B channel under the inversion and 0.3 for the A channel;

S103: performing image morphology operation: a combination of one or more of corrosion operation and expansion operation; and S104; performing fine screening according to a nuclear occupancy parameter to remove non-cells each having a nuclear occupancy ratio below 0.3 and a nucleus radius above 150 pixels and below 10 pixels, wherein the nuclear occupancy ratio is obtained by dividing a nuclear area finely segmented according to the color difference threshold by a radius circle area of the detected feature point.

In a preferred solution, the implementation steps are as follows:

S1: numbering: numbering samples on the slide to determine sample numbers in a cloud system;

S2: registration: entering subject information corresponding to the slide into the system and entering the sample numbers;

scanning: scanning images of the slide with the mobile phone;

S3: uploading: uploading the scanned image samples to the cloud system;

S4: stitching classification: processing the digital samples on cloud AI;

S5: connection: associating the registration information with the digitalized sample information in the system;

S6: diagnosis: diagnosing and reviewing the image samples, and submitting a diagnosis opinion operation by a doctor;

S7: report rendering: polling the completely diagnosed data in the system by using a rendering program and rendering the data into PDF, JPG, WORD format files according to corresponding report templates thereof;

thereby achieving cloud processing of the images through the above steps.

The mobile phone-based miniature microscopic image acquisition device provided by the present invention can greatly reduce the prices of digital tissue section scanners in the prior art, and greatly reduce the medical cost. By adopting the structure of the microscope head having a cantilever structure, the volume can be greatly reduced, thereby being convenient to carry and promote. The present invention provides an image stitching method for the mobile phone-based miniature microscopic image acquisition device, which realizes the partition scanning and combination of images, improves the speed of image scanning, and ensures the integrity of the slide samples. The present invention further provides an image recognition method for the mobile phone-based miniature microscopic image acquisition device, which greatly improves the accuracy and efficiency of cell recognition. The present invention may further provide a method for cloud processing of an image for the mobile phone-based miniature microscopic image acquisition device, where the scanned slide samples are transmitted to the cloud, and are stitched and recognized on the cloud to achieve long-distance AI diagnosis and doctors' re-examination, which not only improves the detection efficiency, but also reduces the requirements of sample detection for regions. In addition, the original sample data of detection can be retained, and the data are further researched, so that more remote medical institutions can also apply such technology for diagnosis.

BRIEF DESCRIPTION OF THE DRAWINGS

The present invention is further described below with reference to the drawings and the embodiments.

Figure 1:
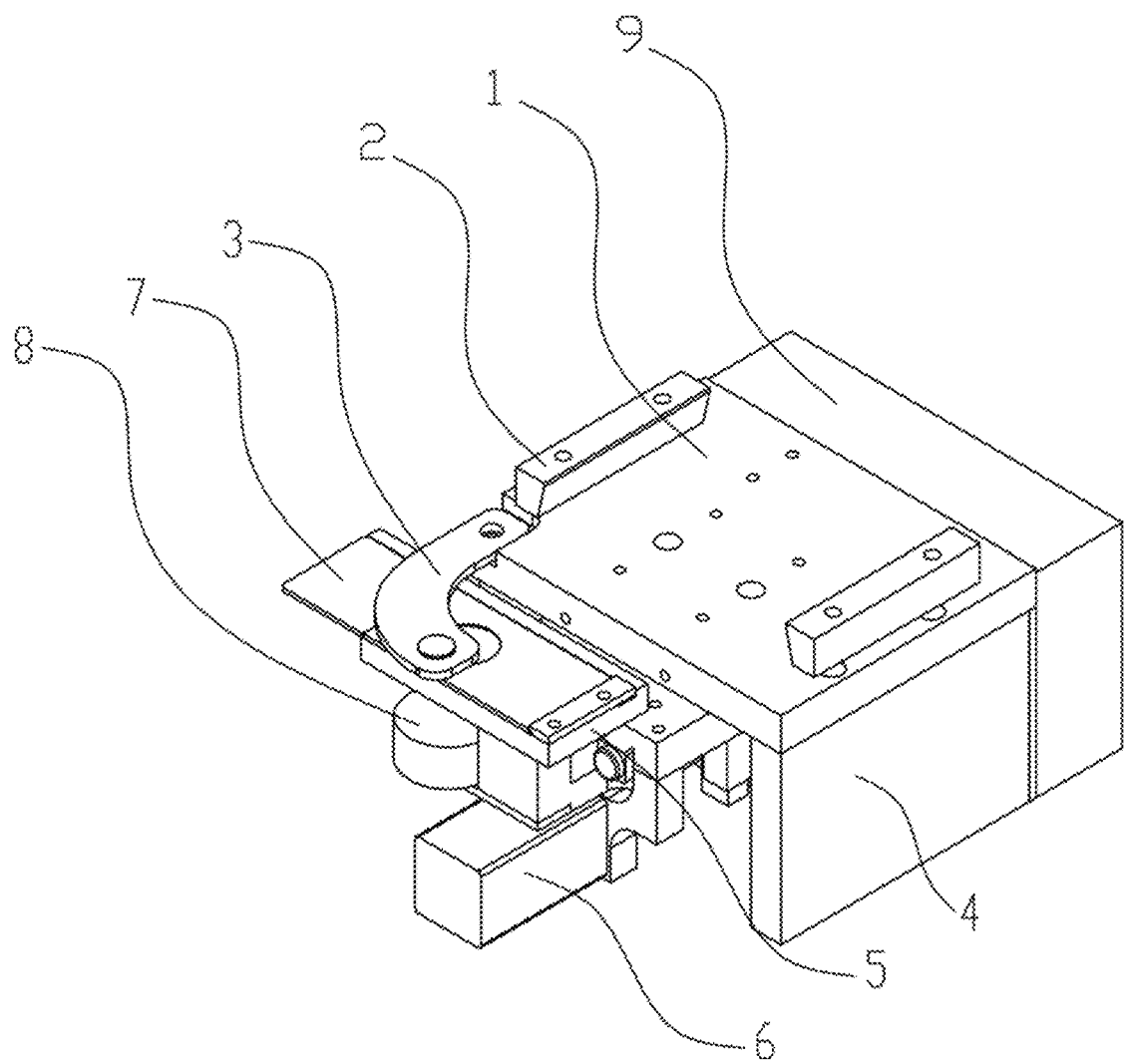
FIG. 1 is a stereoscopic structural schematic diagram of the present invention.

In drawings, the reference symbols represent the following components: mobile phone fixing table 1, positioning block 2, microscope head 3, replaceable microscope lens 31, cantilever rod 32, support 4, slide holder 5, first slide stop 51, second slide stop 52, Y-axis drive nut 53, Y-axis screw rod 54, Y-axis drive motor 6, slide 7, lighting source 8, control box 9, X-axis drive motor 10, X-axis screw rod 101, X-axis slider 102, X-axis drive nut 103, Y-axis guide rail 104, X-axis guide rail 105, positioning pin 106, screw 107, sunken stage 108, mobile phone 11, fixing screw 12, and magnetic attraction block 13.

DETAILED DESCRIPTION

Embodiment 1

As shown in FIGS. 1 to 4, a mobile phone-based miniature microscopic image acquisition device comprises a support, wherein a mobile phone fixing table is provided on the support for fixing a mobile phone. A microscope head is provided below a camera of the mobile phone. A slide holder is provided below the microscope head. A lighting source is provided below the slide holder. Preferably, the lighting source is an LED power source. With this structure, when in use, light of the lighting source passes through a slide on the slide holder, and images of cells are transmitted to the camera of the mobile phone through the microscope head, so as to be acquired and stored by the camera of the mobile phone.

Figure 3:
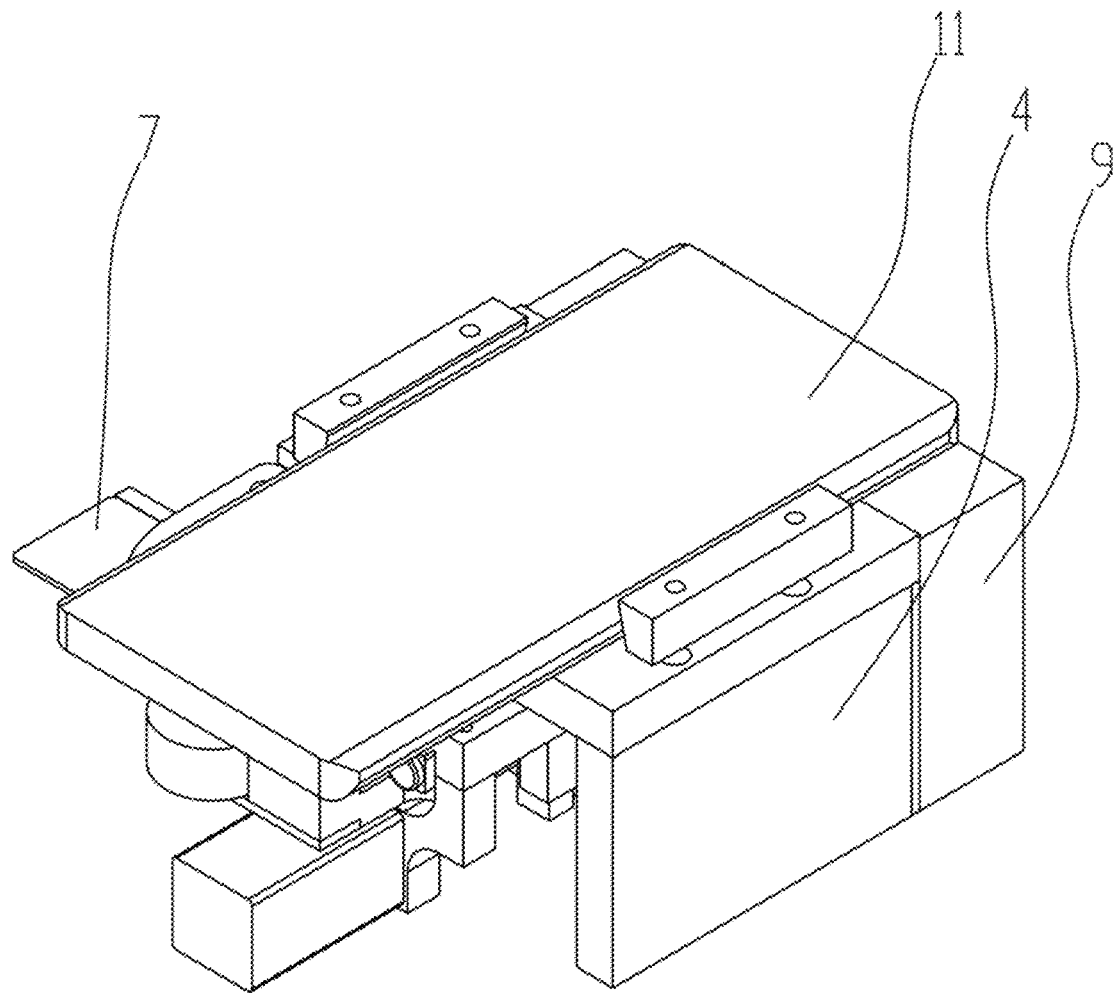
FIG. 3 is a stereoscopic structural schematic diagram when a mobile phone is used in the present invention.
Figure 4:
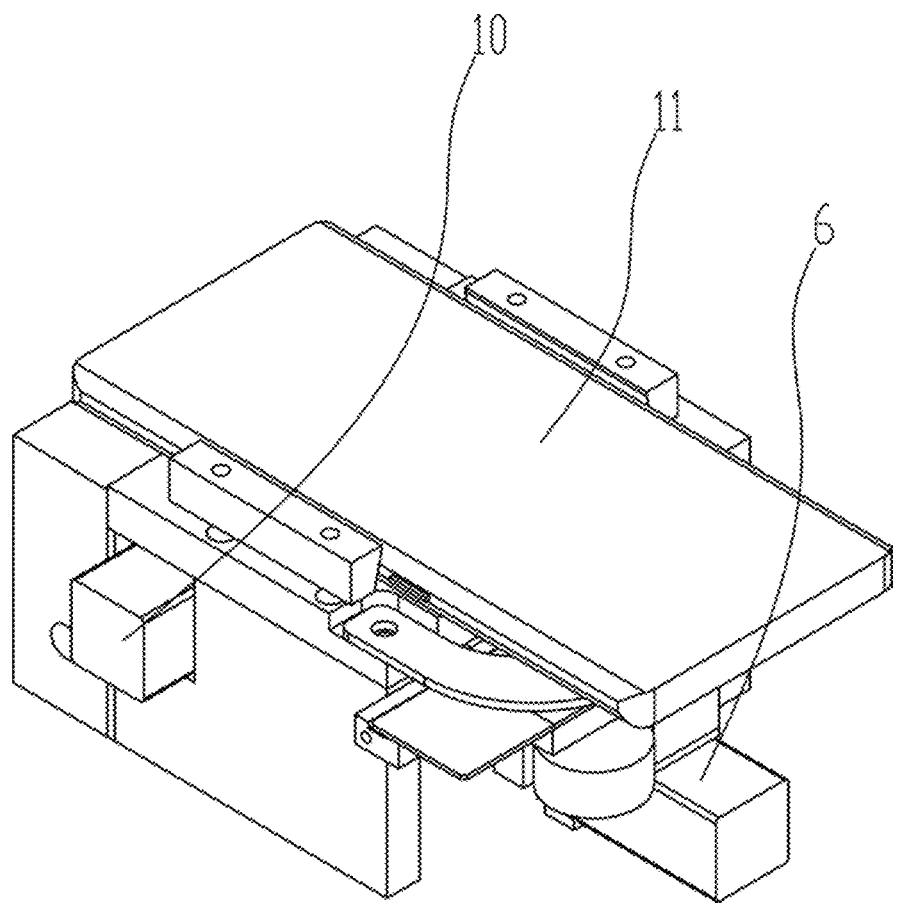
FIG. 4 is a stereoscopic structural schematic diagram in yet another direction when the mobile phone is used in the present invention.
Figure 5:
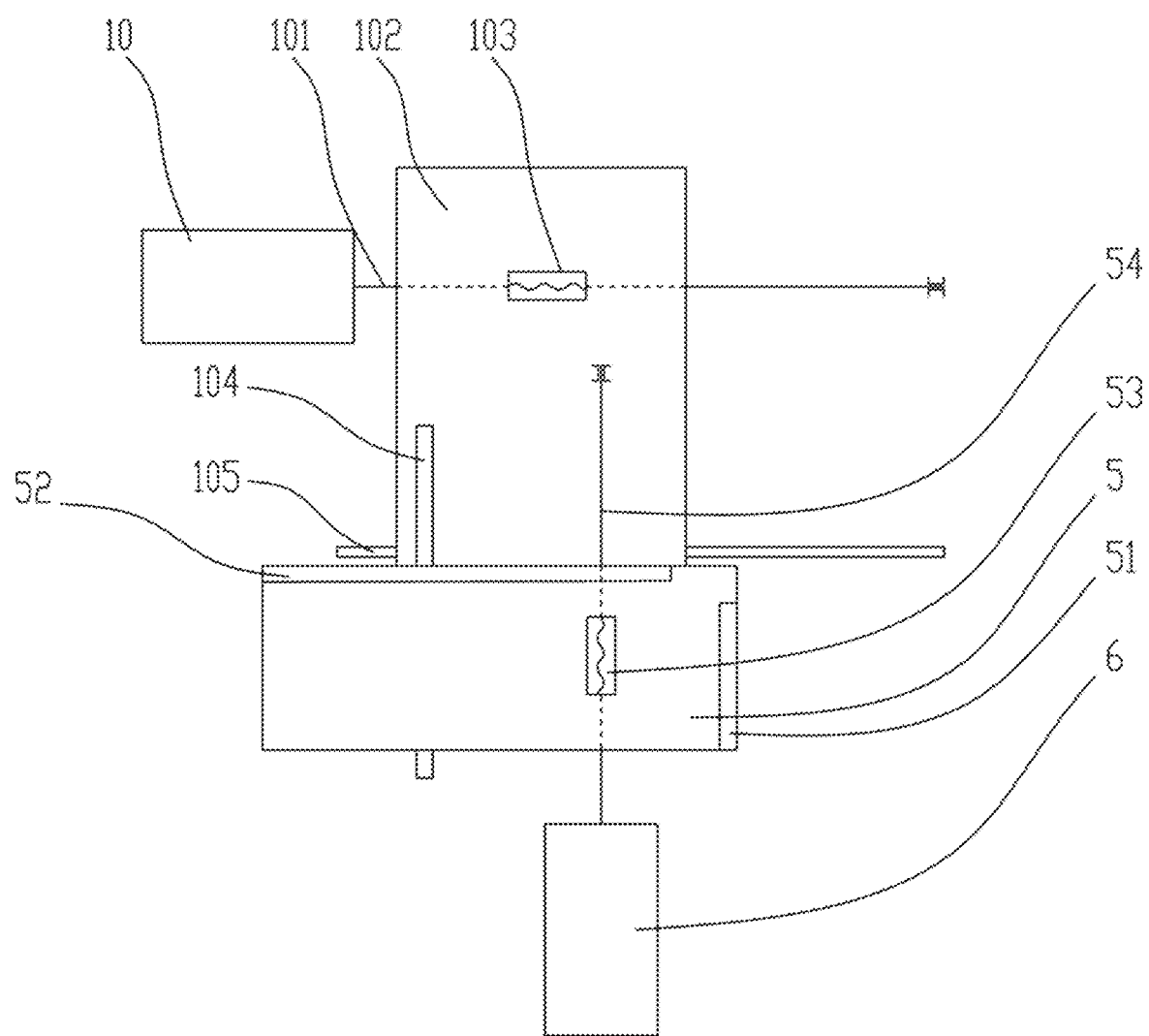
FIG. 5 is a structural schematic diagram of a driving mechanism of a slide holder in the present invention.

As shown in FIGS. 3 to 5, a scanning movement is performed between the slide holder 5 and the microscope head 3 along X and Y axes, so that images of the slide 7 is acquired into the mobile phone 11.

Figure 8:
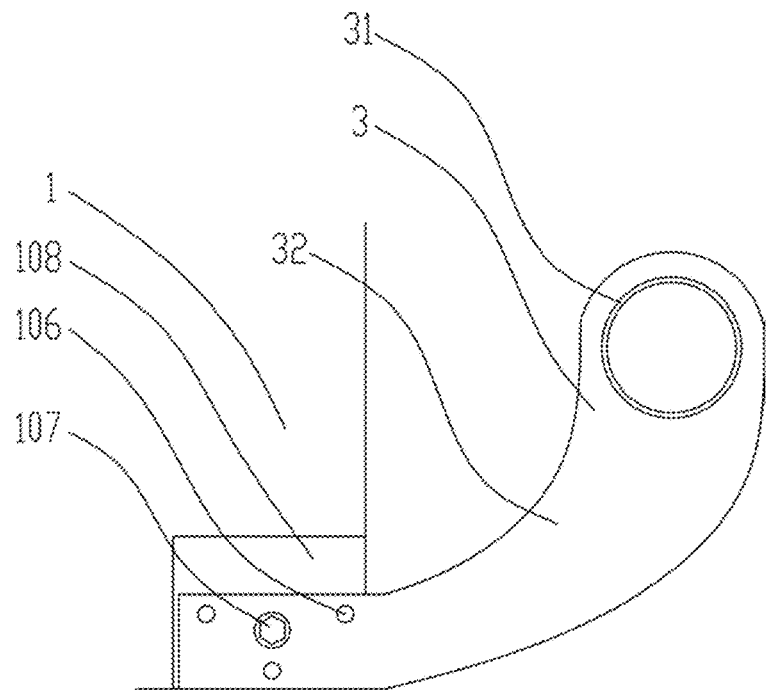
FIG. 8 is a structural schematic diagram of a microscope head in the present invention.

In a preferred solution, as shown in FIG. 8, the microscope head 3 includes a cantilever rod 32 mounted on the mobile phone fixing table 1. The cantilever rod 32 has a shape bent from one side of the mobile phone fixing table 1 toward the camera. One end of the cantilever rod 32 is fixedly connected to the mobile phone fixing table 1, and a microscope lens is provided on the other end of the cantilever rod 32. In a preferred solution, the magnification of the microscope lens is 2 to 10 times. Further preferably, the magnification of the microscope lens is 4 times. The microscope lens is located below the camera of the mobile phone 11. In the present invention, a complicated optical path structure of a microscope in the prior art is replaced with a microscope head 3, thereby further reducing the cost and the volume, and further improving the sharpness of an image.

Figure 2:
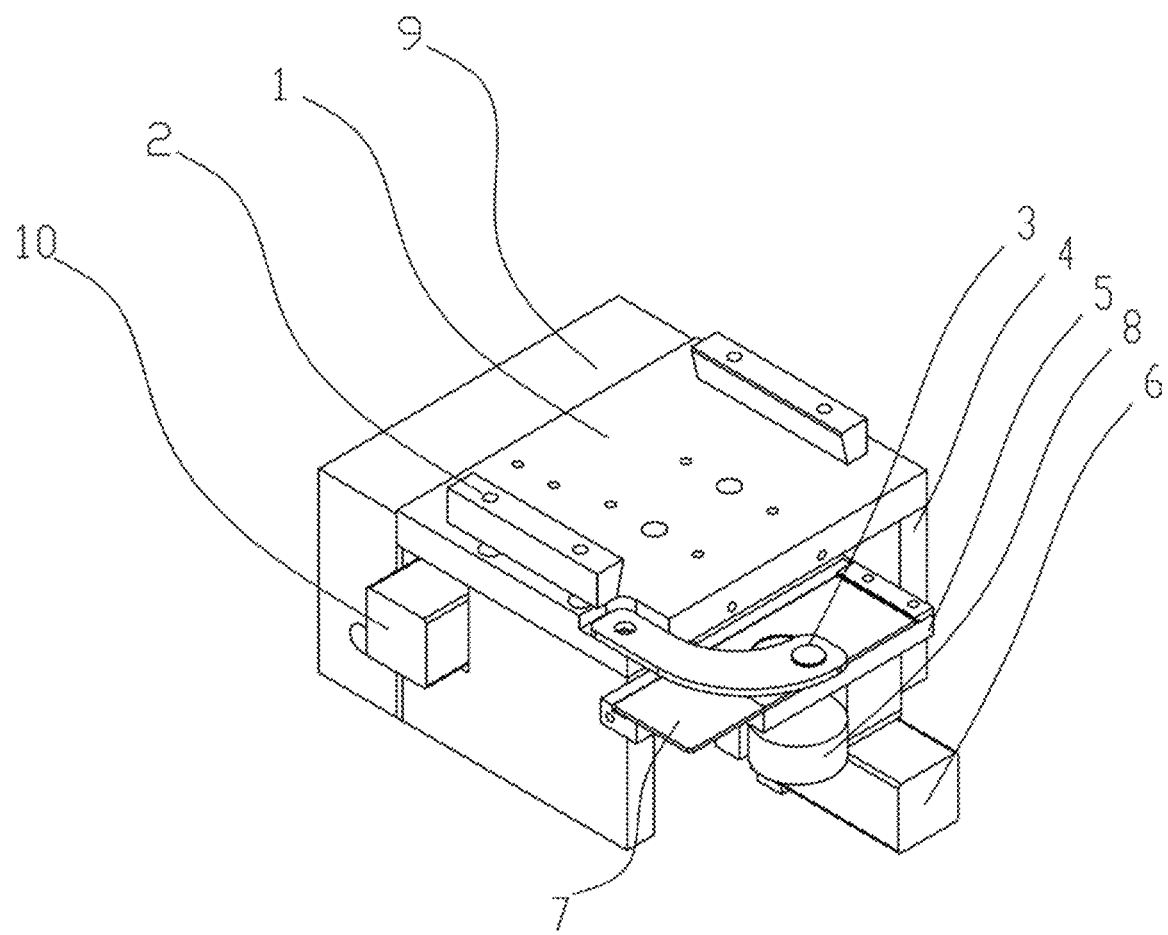
FIG. 2 is a stereoscopic structural schematic diagram in another direction of the present invention.

In a preferred solution, as shown in FIGS. 2 and 8, the mobile phone fixing table 1 is provided with a sunken stage 108 near the camera of the mobile phone 11, and the cantilever rod 32 is fixedly connected to the sunken stage 108 by a screw 107. With this structure, the microscope head 3 can be mounted and connection conveniently.

In a preferred solution, as shown in FIG. 8, the mobile phase fixing table 1 is provided with a sunken stage 108 near the camera of the mobile phone 11. The sunken stage 108 is provided with at least one positioning pin 106, the tip of the cantilever rod 32 is provided with a corresponding pin hole, and the positioning pin 106 is slidably connected to the pin hole. The screw 107 is in threaded connection with the cantilever rod 32. The tip of the screw 107 props against the sunken stage 108. A distance between the cantilever rod 32 and the sunken stage 108 is adjusted by the rotation of the screw 107, thereby adjusting a distance between the microphone lens 31 and the camera of the mobile phone 11. Further preferably, a further fixing screw is further provided to pass through the cantilever rod 32 and to be in threaded connection with the sunken stage 108. After adjusting to a proper position, the further screw is tightened.

In a preferred solution, the microscope lens is a replaceable microscope lens 31. The replaceable microscope lens 31 is of a structure in movable socketing with the cantilever rod 32, thereby facilitating the adjustment of the magnification by replacing the microscope lens.

Figure 6:
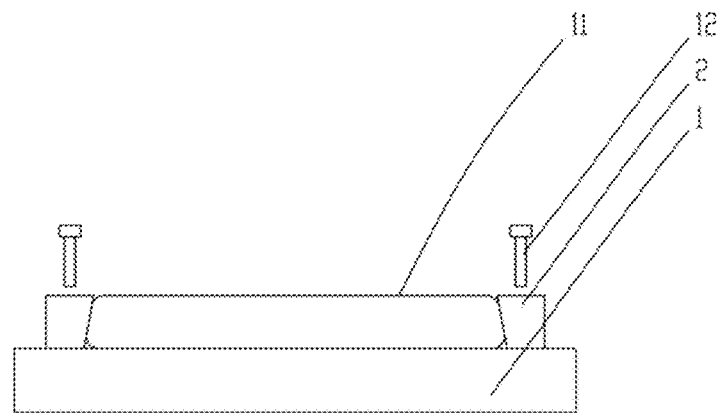
FIG. 6 is a structural schematic diagram when the mobile phone is fixed on a mobile phone fixing table in the present invention.

In a preferred solution, as shown in FIGS. 3, 4 and 6, positioning blocks 2 are provided on both sides of the mobile phone fixing table 1, and are connected to the mobile phone fixing table 1 through fixing screws 12. The opposite surfaces of the two positioning blocks 2 are inclined surfaces, and each of the positioning blocks 2 has a wider top and a narrower bottom so as to lock the mobile phone 11 by means of the inclined surfaces. With this structure, the mobile phone 11 can be fixed conveniently.

Figure 7:
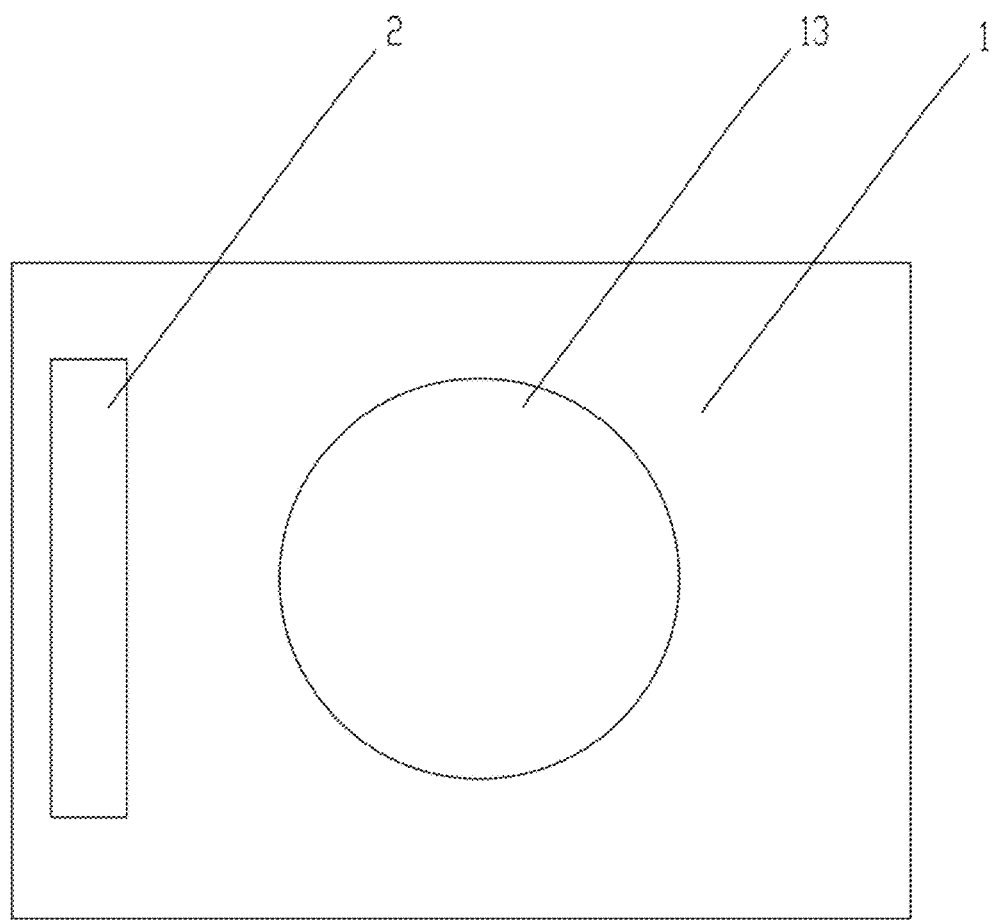
FIG. 7 is a structural schematic diagram when a mobile phone is preferably fixed on the mobile phone fixing table in the present invention.

In a preferred solution, as shown in FIG. 7, a magnetic attraction block 13 is provided on the surface of the mobile phone fixing table. With this structure, it is convenient to adjust according to different camera positions of the mobile phone 11, so that the camera of the mobile phone 11 and the microscope lens of the microscope head 3 are aligned.

Alternatively, a positioning block 2 is provided on at least one side of the mobile phone fixing table 1, and meanwhile a magnetic attraction block 13 is provided on the surface of the mobile phone fixing table 1. With this structure, the mobile phone 11 can be positioned and fixed conveniently.

Alternatively, a positioning block 2 is provided on at least one side of the mobile phone fixing table 1, and a silicone friction plate is provided on the surface of the mobile phone fixing table 1. With this structure, the mobile phone 11 can be positioned and fixed conveniently by using the frictional force of the silicone friction plate.

Figure 10:
FIG. 10 is a schematic diagram in which an image matched with a visual field sub-block is processed after a slide is scanned in the present invention.
Figure 10:
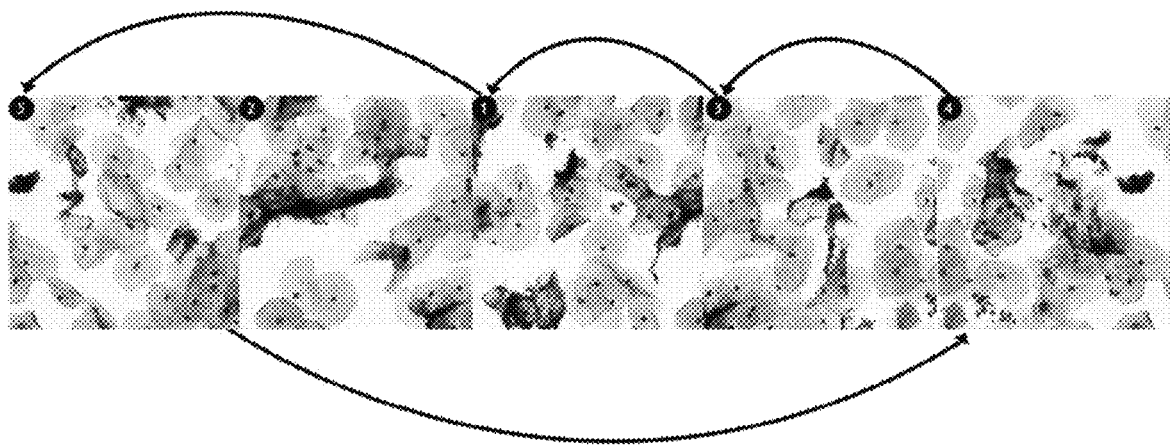
Figure 11:
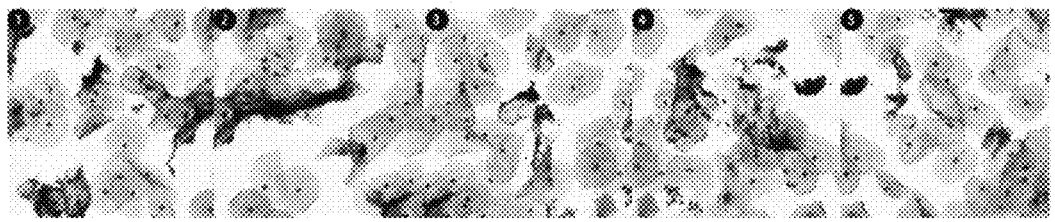
FIG. 11 is a schematic diagram after scanned pictures are stitched in the present invention.
Figure 11:
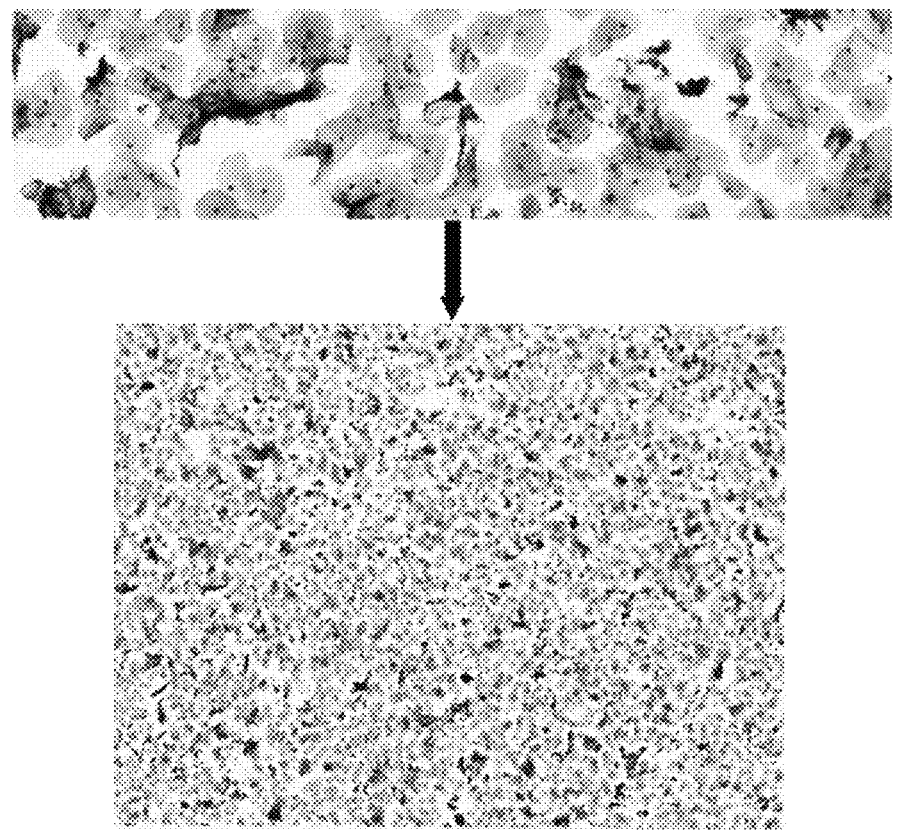
Figure 12:
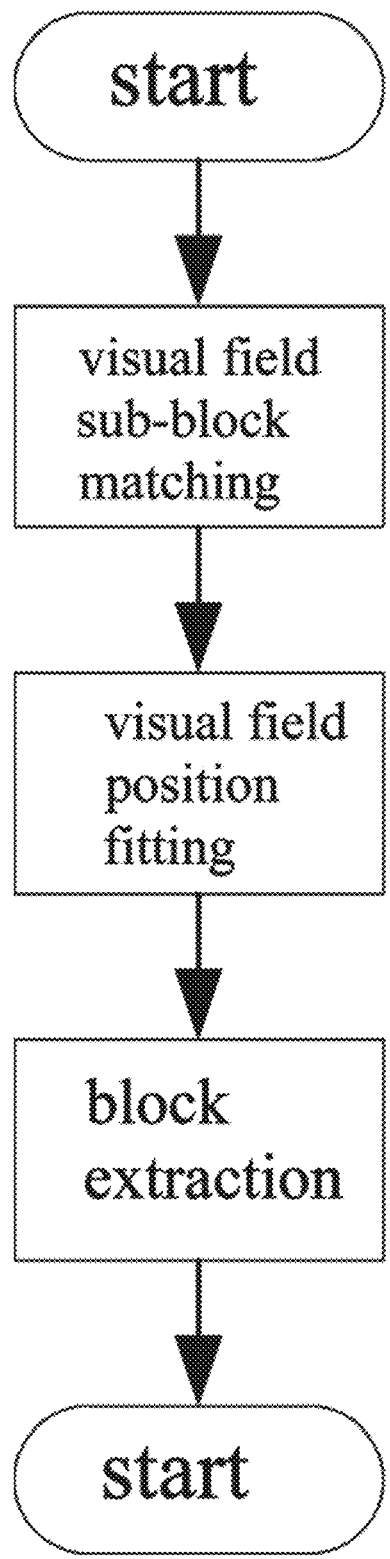
FIG. 12 is a schematic flowchart showing an image stitching process in the present invention.

In a preferred solution, as shown in FIG. 5, the slide holder 5 is provided on a scanning mechanism running along the X and Y axes. With this structure, a slide image can be conveniently decomposed into a plurality of small images to be photographed, through a serpentine scanning movement of the slide holder 5, and the small images are then stitched into a panoramic image, as shown in FIGS. 10 and 11.

In a preferred solution, as shown in FIG. 5, an X-axis guide rail 105 is fixedly provided on the support 4. An X-axis slider 102 is slidably mounted on the X-axis guide rail 105. An X-axis drive nut 103 is fixedly provided on the X-axis slider 102. An X-axis drive motor 10 is connected to an X-axis screw rod 101. The X-axis screw rod 101 is in threaded connection with the X-axis drive nut 103, so that the X-axis drive motor 10 drives the X-axis slider 102 to reciprocate along the X-axis guide rail 105. A Y-axis guide rail 104 is fixedly provided on the X-axis slider 102. The slide holder 5 is slidably mounted on the Y-axis guide rail 104. A Y-axis drive nut 53 is fixedly provided on the slide holder 5. A Y-axis drive motor 6 is connected to a Y-axis screw rod 54. The Y-axis screw rod 54 is in threaded connection with the Y-axis drive nut 53, so that the Y-axis drive motor 6 drives the slide holder 5 to reciprocate along the Y-axis guide rail 104. With the above structure, the slide holder 5 makes a serpentine scanning movement along the X and Y axes.

In a preferred solution, the X-axis drive motor 10 and the Y-axis drive motor 6 are stepping motors.

Figure 9:
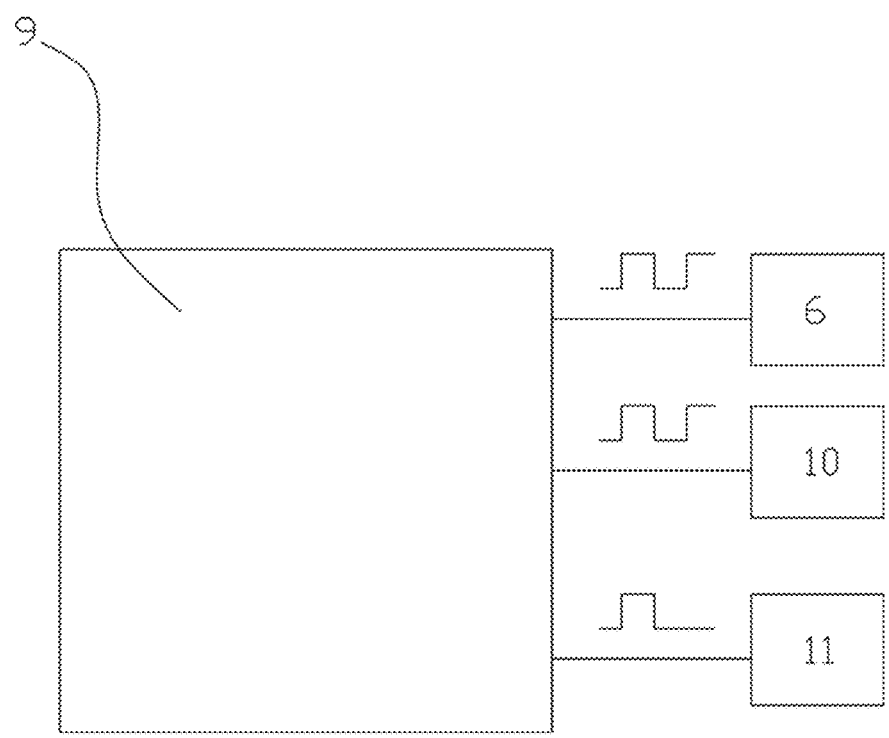
FIG. 9 is a control schematic diagram of a control box in the present invention.

In a preferred solution, as shown in FIG. 9, the mobile phone-based miniature microscopic image acquisition device is further provided with a control box 9, wherein at least one pin of the control box 9 outputs a switch signal to be connected to the mobile phone 11 to control the mobile phone to take pictures. The control box 9 is further in point connection with the lighting source 8, such that the lighting source 8 provides backlight in the photographing process.

At least two pins of the control box 9 output pulse signals respectively to be connected to the X-axis drive motor 10 and the Y-axis drive motor 6, respectively, to drive the X-axis drive motor 10 and the Y-axis drive motor 6 to rotate respectively. Preferably, the control box is controlled by a single chip microcomputer, such as STMicroelectronics' STM32F series single chip microcomputer.

During in use, as shown in FIGS. 1-11, the mobile phone 11 is fixed on the mobile phone fixing table 1, the camera of the mobile phone 11 is aligned with the microscope head 3. A specimen slide is placed on the slide holder 5. Test shooting is performed to adjust the parameters of the mobile phone according to the sharpness of an image, or adjust the height position of the microscope head 3. Since the connecting position between the cantilever rod 32 and the mobile phone fixing table 1 is outside a coverage range of the mobile phone 11, such height adjustment is easy, and the adjustment is also convenient to adapt to different types of mobile phones. After the adjustment is completed, the mobile phone 11 is connected to the control box 9 through a signal line. The slide 7 is positioned on the slide holder 5, and a button of the control box 9 is activated, such that the lighting source 8 is turned on.

This activation method can also be controlled through an app interface on the mobile phone. The control box 9 sends a switch signal to the mobile phone and the lighting source 8, and at the same time the mobile phone takes a picture and saves the image. The control box 9 sends a pulse signal to the X-axis drive motor 10 to drive the X-axis drive motor 10 to rotate for a preset angle, so that the rotation of the X-axis screw rod 101 drives the X-axis drive nut 103 to move a certain distance, and the corresponding X-axis slider 102 moves a certain distance, such that the slide holder 5 moves a certain distance along the X axis. The control box 9 sends a switch signal to the mobile phone and the lighting source 8, the lighting source 8 is turned on, and meanwhile, the mobile phone takes a picture until the slide holder 5 completes a preset stroke along the X axis, thereby completing the photographing of a row of pictures on the slide. The control box 9 sends a pulse signal to the Y-axis drive motor 6 to drive the Y-axis drive motor 6 to rotate for a preset angle, so that the rotation of the Y-axis screw rod 54 drives the Y-axis drive nut 53 to move a certain distance, the slide holder 5 moves a certain distance along the Y axis, and the control box 9 controls the mobile phone to take a picture. Then, the control box 9 drives the slide holder 5 to walk along the X axis again for a preset stroke, and scans the images of the slide 7 into the mobile phone in a serpentine scanning manner. Next, the mobile phone sends the pictures to a server through a network, and the pictures are stitched into a panoramic image of the slide at the server. The cells in the panoramic image are classified, recognized and identified by an artificial intelligence method, thereby facilitating doctor's diagnosis, completing the acquisition and assistant diagnosis works of slide images, and greatly improving the diagnosis efficiency of the doctor.

Embodiment 2

In a preferred solution, as shown in FIGS. 10-15, in an image stitching process, a visual field sub-block matching module, a visual field position fitting module, and a block extraction module are included. The visual field sub-block matching module is configured to identify an overlapping region between every two adjacent images and determine an adjacent positional relationship between the sub-images, so that the sub-images acquired by a microscopic scanning device are automatically arranged in a stitching order of the images. The visual field position fitting module is configured to finely tune positions according to the overlapping region between every two adjacent sub-images, so that cell positions are accurately stitched.

The block extraction module is configured to automatically extract a completely stitched image.

The specific implementation steps are as follows:

S1: visual field sub-block matching: the visual field sub-block matching module is configured to identify an overlapping region between every two adjacent images and determine an adjacent positional relationship between the sub-images, so that the sub-images acquired by a microscopic scanning device are automatically arranged in a stitching order of the images;

S2: visual field position fitting: the visual field position fitting module is configured to finely tune positions according to the overlapping region between every two adjacent sub-images, so that cell positions are accurately stitched;

S3: block extraction: the block extraction module is configured to automatically extract a completely stitched image.

Figure 13:
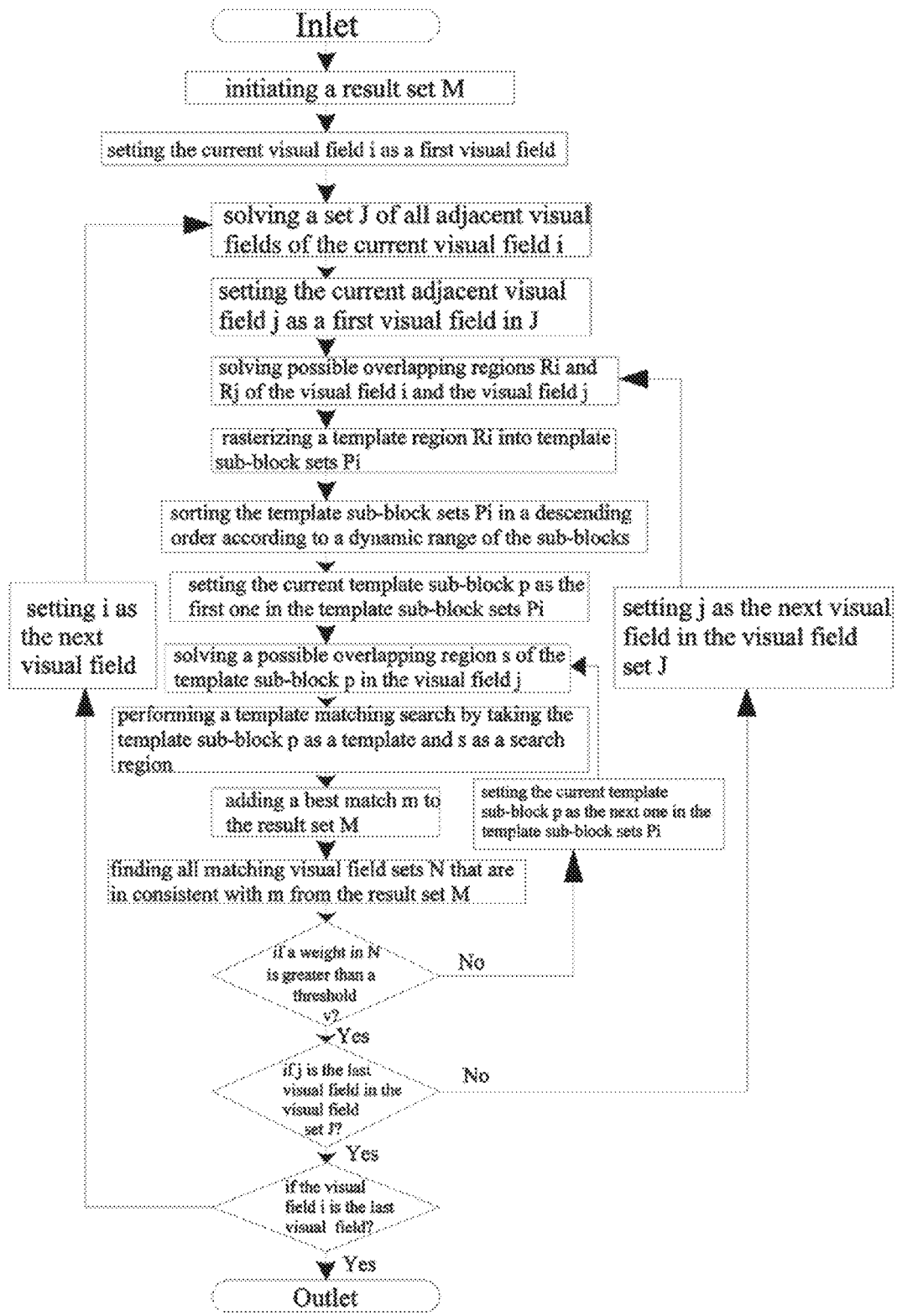
FIG. 13 is a schematic flowchart showing visual field sub-block matching in the present invention.
Figure 14:
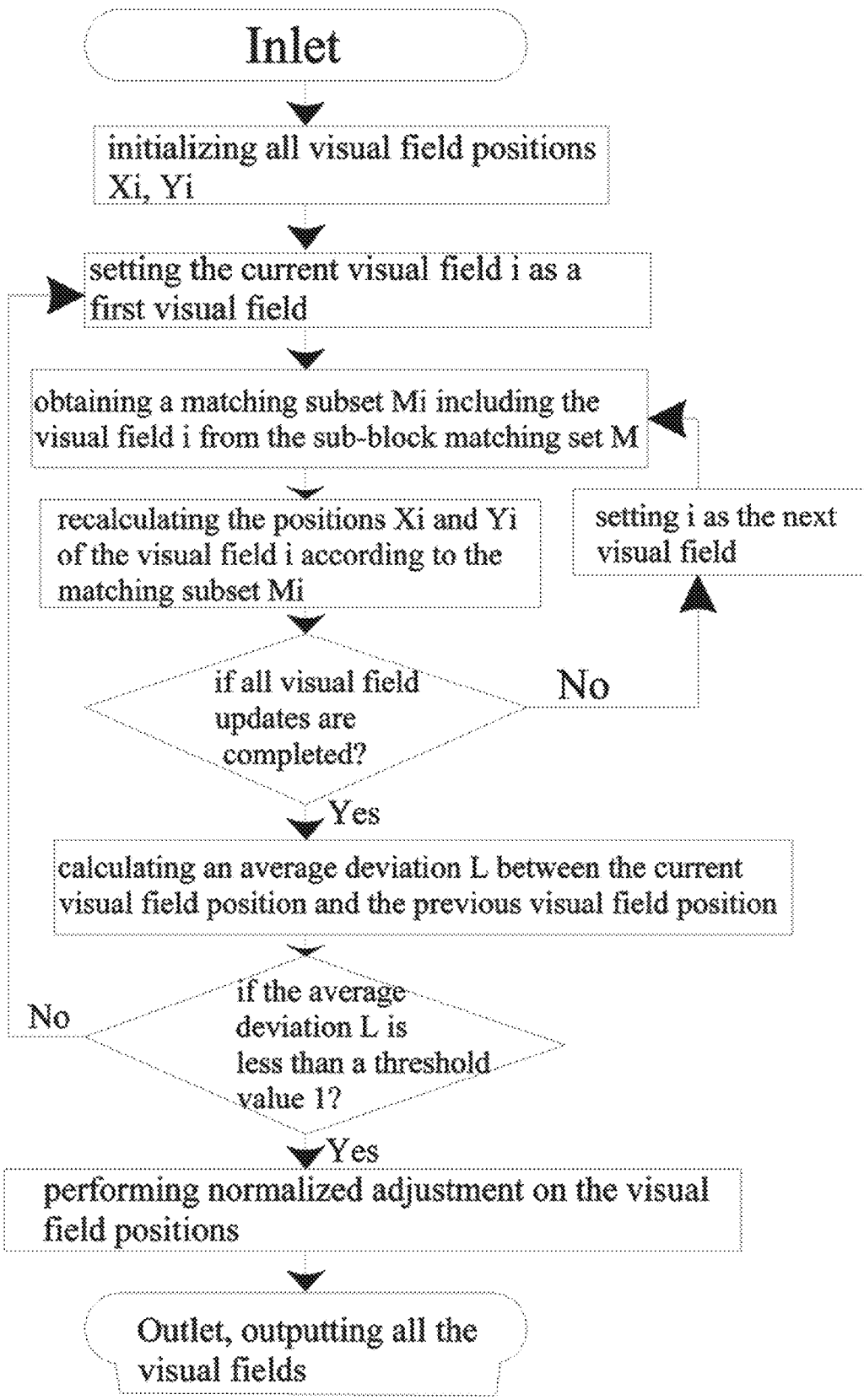
FIG. 14 is a schematic flowchart showing visual field position fitting in the present invention.
Figure 15:
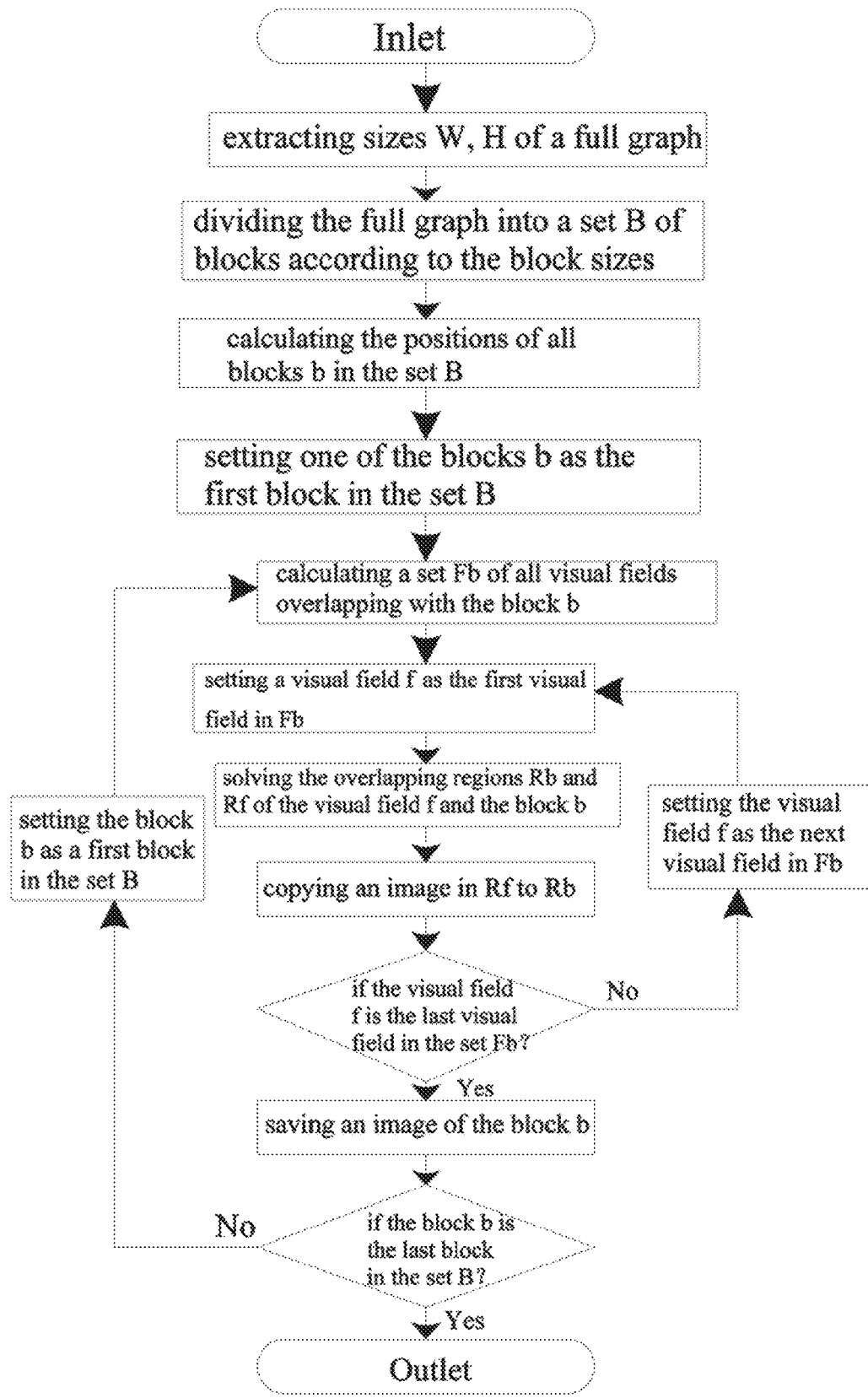
FIG. 15 is a schematic flowchart showing block extraction in the present invention.

As shown in FIGS. 10 and 13, the operating process of the visual field sub-block matching in step S1 is as follows:

Sa01: inputting and initiating a result set M;
Sa02: setting the current visual field i as a first visual field;
Sa03: solving a set J of all adjacent visual fields of the current visual field i;
Sa04: setting the current adjacent visual field j as a first visual field in J;
Sa05: solving possible overlapping regions Ri and Rj of the visual field i and the visual field j;
Sa06: rasterizing a template region Ri into template sub-block sets Pi;
Sa07: sorting the template sub-block sets Pi in a descending order according to a dynamic range of the sub-blocks;
Sa08: setting the current template sub-block P as the first one in the template sub-block sets Pi;
Sa09: solving a possible overlapping region s of the template sub-block P in the visual field J;
Sa10: performing a template matching search by taking the template sub-block P as a template and s as a search region;
Sa11: adding a best match m to the result set M;
Sa12: finding all matching visual field sets N that are in consistent with m from the result set M;
Sa13: judging whether or not a weight in N is greater than a threshold v upon comparison; if not, setting the current template sub-block P as the next one in the template sub-block sets Pi and returning to Sa09; and if yes, proceeding to next step;
Sa14: judging whether or not the visual field j is the last visual field in the visual field set J upon comparison; if not, setting the visual field j as the next visual field in the visual field set J and returning to Sa05; and if yes, proceeding to next step;
Sa15: judging whether or not the visual field i is the last visual field upon comparison; if not, setting i as the next visual field and returning to Sa03; and if yes, outputting a result;

as shown in FIGS. 14 and 11, the process of visual field position fitting in step S2 is as follows:

Sa16: inputting and initializing all visual field positions Xi, Yi;
Sa17: setting the current visual field i as a first visual field;
Sa18: obtaining a matching subset Mi including the visual field i from the sub-block matching set M;
Sa19: recalculating the positions Xi and Yi of the visual field i according to the matching subset Mi;
Sa20: judging whether or not all visual field updates are completed; if not, setting the visual field i as the next visual field; and if yes, proceeding to next step;
Sa21: calculating an average deviation L between the current visual field position and the previous visual field position;
Sa22: judging whether or not the average deviation L is less than a threshold value 1 upon comparison; if not, returning to Sa17; and if yes, proceeding to next step;
Sa23: performing normalized adjustment on the visual field positions; outputting all the visual fields;

as shown in FIG. 15, the process of block extraction in step S3 is as follows:

Sa24: extracting sizes W, H of a full graph;
Sa25: dividing the full graph into a set B of blocks according to the block sizes;
Sa26: calculating the positions of all blocks b in the set B;
Sa27: setting one of the blocks b as the first block in the set B;
Sa28: calculating a set Fb of all visual fields overlapping with the block b;
Sa29: setting a visual field f as the first visual field in Fb;

Sa30: solving the overlapping regions Rb and Rf of the visual field f and the block b;

Sa31: copying an image in Rf to Rb;

Sa32: judging whether or not the visual field f is the last visual field in the set Fb; if not, setting the visual field f as the next visual field in Fb and returning to Sa29; and if yes, proceeding to next step;

Sa33: saving an image of the block b;

Sa34: judging whether or not the block b is the last block in the set B; if not, setting the block b as a first block in the set B and returning to Sa28; and if yes, outputting a result.

Embodiment 3

As shown in FIGS. 10-11 and 16-18, a case of a cell pathology analysis is taken as an example: an image acquired from the mobile phone by scanning is shown in the upper image of FIG. 10, and various sub-images are ordered irregularly, which depends on an automatic acquisition path of scanning of the mobile phone. During the acquisition process, it is necessary to ensure that there are mutually overlapping positions between every two of the images. The pixel values of the overlapping positions are analyzed. The images are automatically matched with the corresponding positions by means of a visual field sub-block matching intelligent algorithm. An initial value of a two-dimensional transformation matrix from a platform offset to a pixel offset is calculated according to the matching feature points in the adjacent virtual fields, thereby obtaining stitching parameters. Specifically, each visual field sub-block is determined, that is, the adjacent positions of the sub-image relative to other sub-images are determined. A common part between the adjacent visual fields is cut into a plurality of small blocks, common coincident regions are found by using template matching, and matching blocks with a matching threshold greater than 0.9 are selected. The correlation of template matching for all visual fields is calculated. As shown in FIG. 11, after the position matching is successful, the positions of the cells will be slightly deviated, and the positions of the cells are accurately stitched by a visual field position fitting intelligent algorithm. Specifically, after template matching, the approximate positions of pixels in each visual field can be obtained. The maximum pixel deviation is calculated according to initial stitching parameters and a maximum displacement deviation of the platform. The points where each visual field has a matching relationship with the neighboring visual field are filtered by using the maximum pixel deviation, so as to remove points the deviation of which is greater than the maximum pixel deviation. The stitching parameters are recalculated according to the screened points. The pixel positions of the visual fields are recalculated by using the latest stitching parameters. Through continuous iterative filtering and recalculation, the picture position in each visual field can be continuously updated and improved, so that the error is smaller and the stitching effect is more perfect. After the picture position in each visual field is calculated, the brightness of each visual field is updated through a background image by using a calculation background during the scanning process, thereby improving the doctor's visual perception to view each visual field. A perfect slide picture can be obtained by stitching, and the entire stitched image may be extracted as a block. Then, according to the needs, the big picture is cut to obtain the pictures with the desired widths and heights, because the big picture stitched by all visual fields will be large and unnecessary.

Embodiment 4

Figure 20:
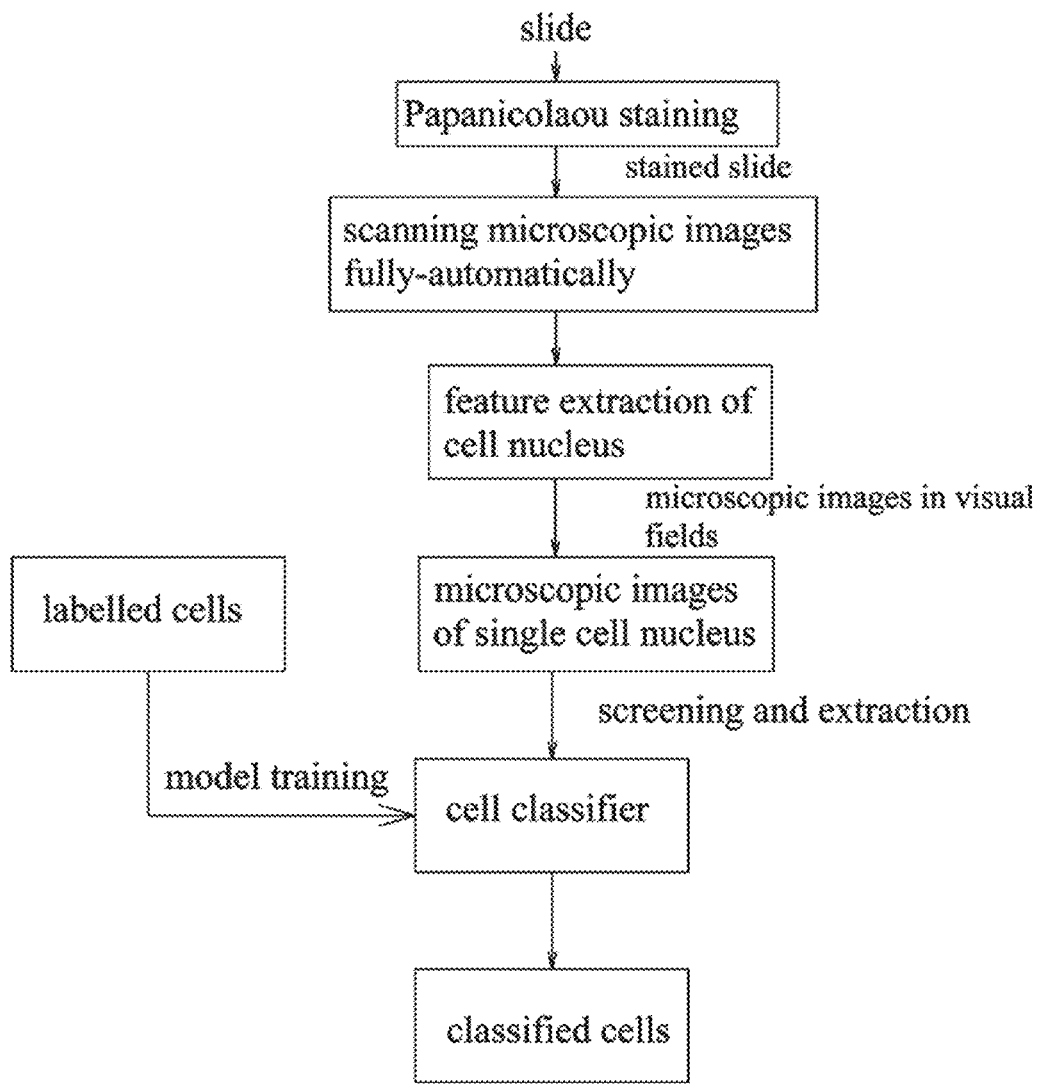
FIG. 20 is a flowchart of an image recognition method in the present invention.

As shown in FIG. 20, an image recognition method adopting the mobile phone-based miniature microscopic image acquisition device comprises the following implementation steps:

S1: acquiring microscopic images;

S2: stitching a plurality of images of a single sample, and extracting according to cell nucleus features in the stitched image to obtain microscopic images of single cell nucleus;

S3: classifying the microscopic images of single cell nucleus according to the labeled cells by means of an artificial intelligence program subjected to model training, wherein the artificial intelligence program preferably uses a convolutional neural network with a learning rate of 0.001. The number of result categories is num_classes=3, which corresponds to positive, negative, and garbage respectively. The number of training rounds: epochs=300; image size: img_cols=128 img_rows=128; regular parameter: reg=0.7; the number of consecutive declines: patience=10.

The sample-based classified cell data are obtained through the above steps.

As shown in FIGS. 16 to 19, the step of acquiring the microscopic images of single cell nucleus in step S2 is as follows:

S100: detecting features points of the cell nucleus;
reducing each image to a plurality of different scales and extracting feature points respectively;

S101: performing preliminary screening, i.e., screening to remove feature points that are too close by using coordinates of the feature points, to reduce repeated extraction of cells. Through this step, the efficiency of recognition is greatly improved.

In this embodiment, if the distance between the feature points does not exceed half of the cell's radius, and the half of the radius is greater than 32, it is considered that that the feature points the distance of which is less than 32 pixels are too close, otherwise the feature points the distance of which is less than half of the cell radius are too close. That is cell.Center.L1DistanceTo (d.Center)<Math.Min (cell.Radius*0.5, 32).

S102: subdividing and segmenting according to a color difference threshold: converting a picture to a LAB format; and after the inversion of a B channel as well as the weighting and Otsu thresholding of an A channel, segmenting to obtain a cell nucleus mask map. In the prior art, gray values are used for screening. However, according to the form of gray value, because gray usually has only one channel, and the value range is only 1-255. Therefore, it is difficult to distinguish for some subtle positions. However, the combined solution of B channel and A channel has two channels, which can greatly increase the value range and improve the screening accuracy.

The weight is 0.7 for the B channel under inversion and 0.3 for the A channel.

S103: performing image morphology operation:
a combination of one or more of corrosion operation and expansion operation. The corrosion calculation and expansion calculation are, for example, calculation methods in the Chinese patent document CN106875404A.

Figure 16:
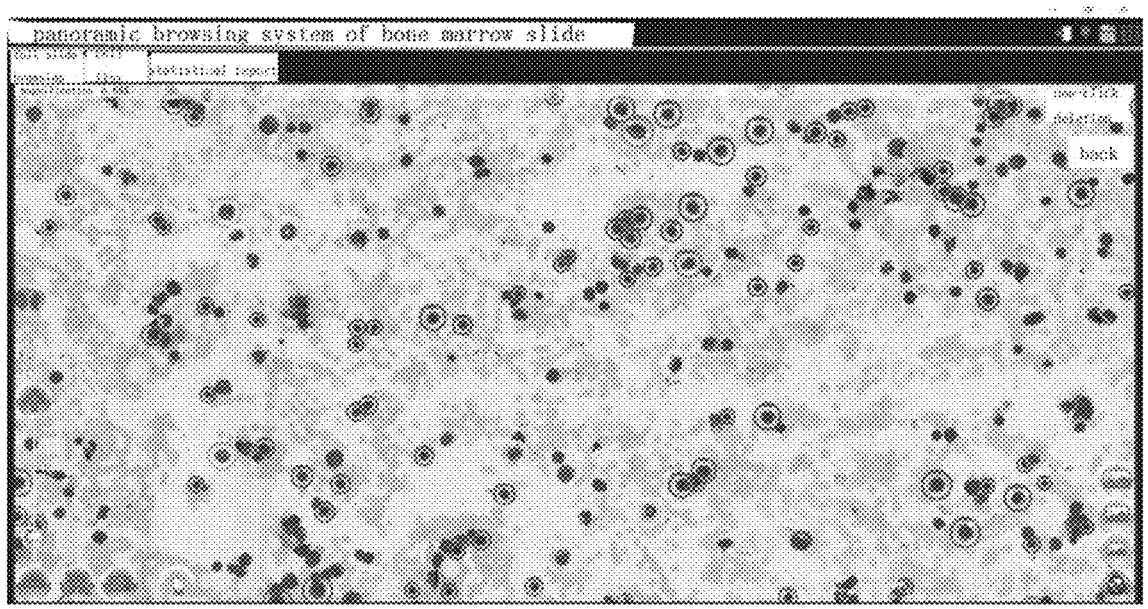
FIG. 16 is an exemplary diagram after image recognition in the present invention.

S104: performing fine screening according to a nuclear occupancy parameter to remove non-cells with a nuclear occupancy ratio below 0.3 and a nucleus radius above 150 pixels and below 10 pixels, wherein the nuclear occupancy ratio is obtained by dividing a nuclear area finely segmented according to the color difference threshold by a radius circle area of the detected feature point. The results are shown in FIG. 16. The recognized images of the feature cells of the user are clearly displayed to facilitate the doctor's diagnosis.

Embodiment 5

Figure 17:
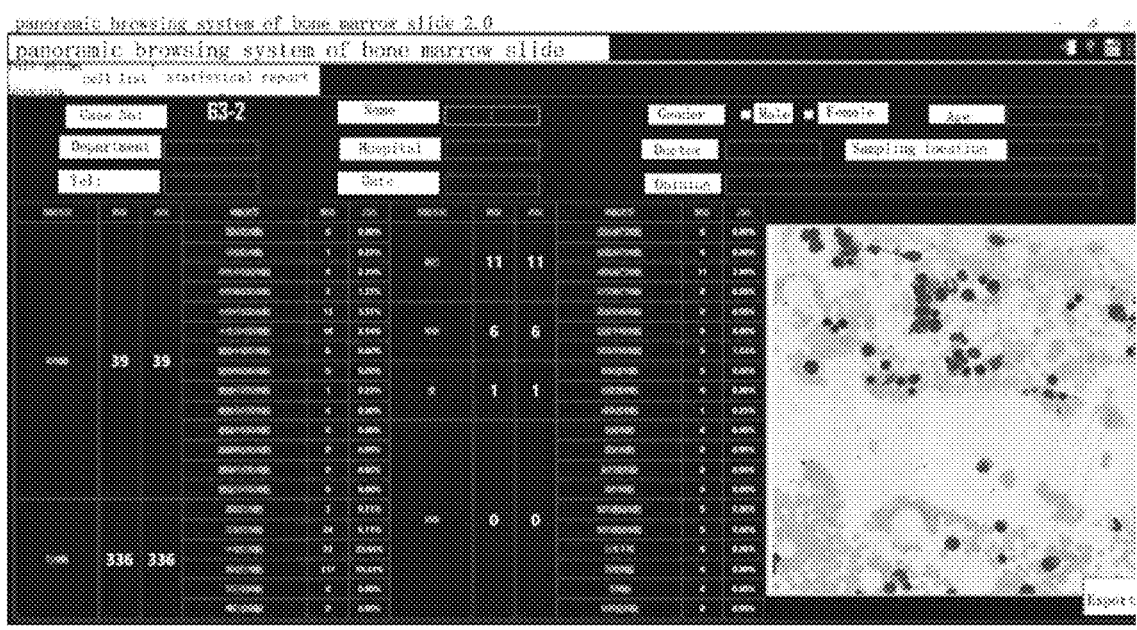
FIG. 17 is an exemplary diagram of a cell classification process in the present invention.
Figure 18:
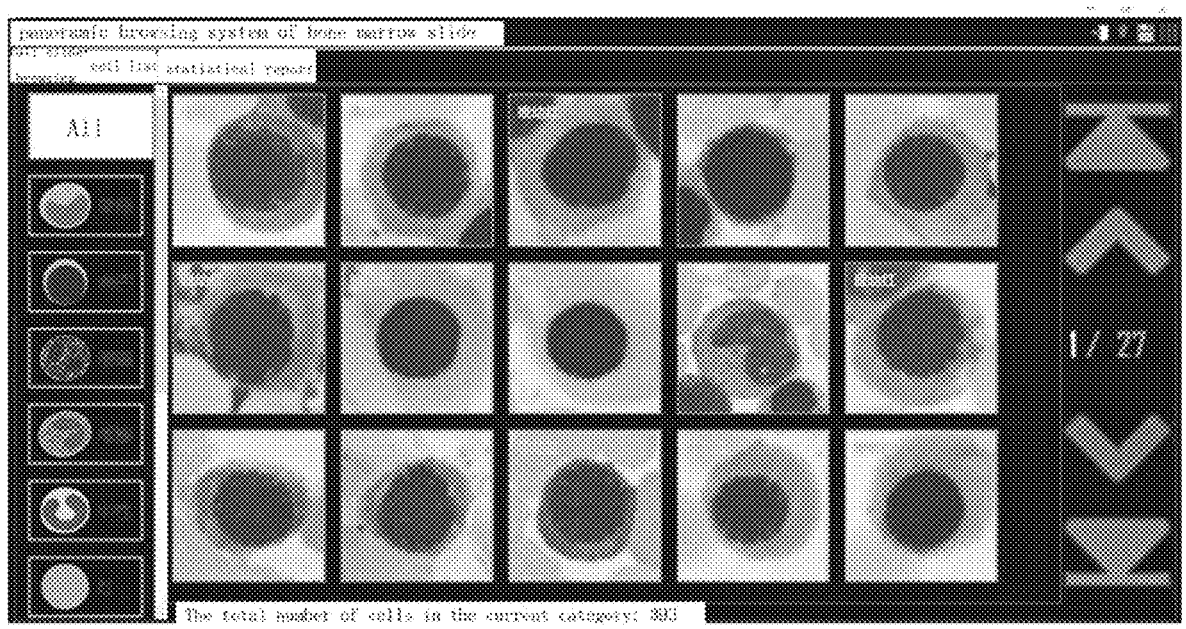
FIG. 18 is a morphology diagram of a single cell nucleus obtained by the present invention and capable of characterizing user's cytopathology.
Figure 19:
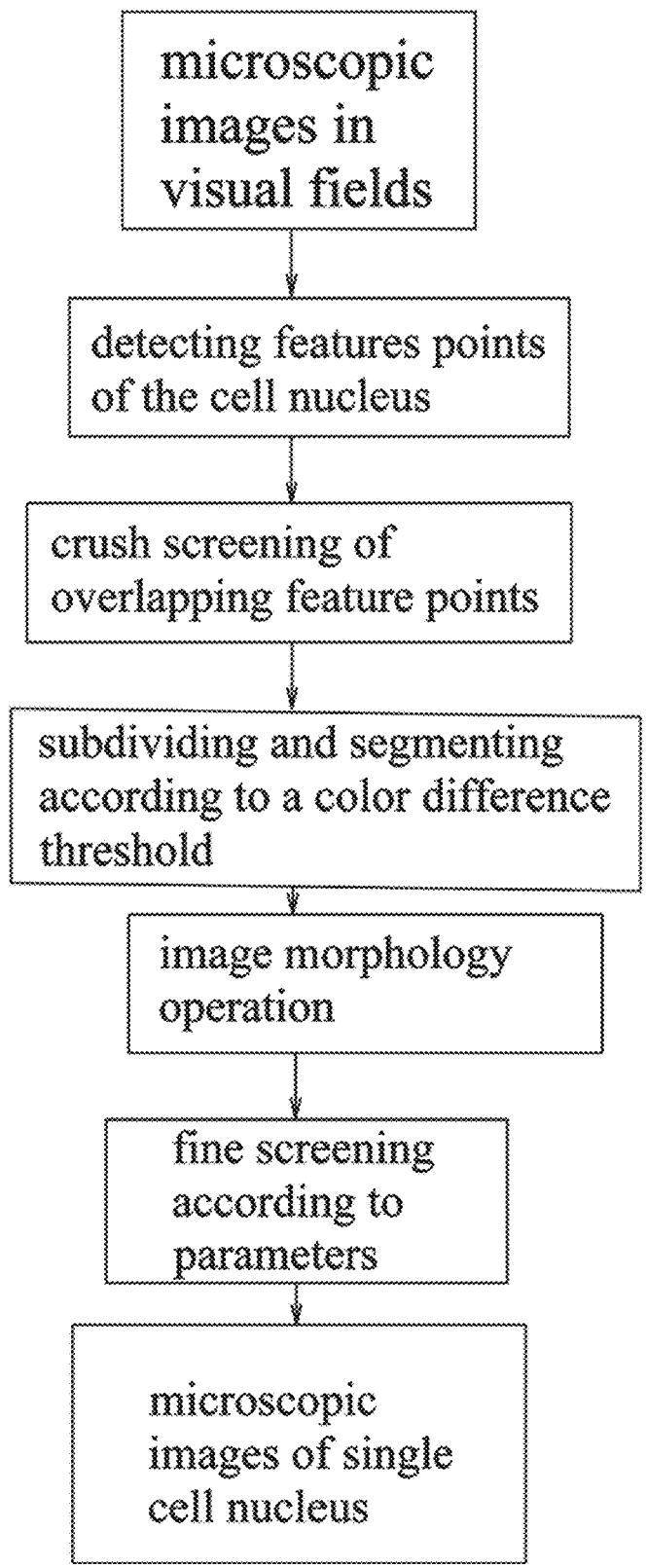
FIG. 19 is a schematic diagram showing a process for acquiring a microscopic image of a single cell nucleus in the present invention.

As shown in FIG. 19, feature points of a cell nucleus are detected. That is, the feature points of the cell nucleus are detected by a SURF algorithm. The image is reduced to different proportions, and the feature points are extracted respectively. Preliminary screening is performed, i.e., feature points that are too close are removed by screening by using coordinates of the feature points, to reduce repeated extraction of cells, that is, only one of cells with the same feature points remains. Through this step, the efficiency of recognition is greatly improved. Subdividing is performed, i.e., segmenting according to a color difference threshold. Compared with gray-level threshold segmentation, the color-difference threshold segmentation scheme can greatly improve the accuracy of subdivision. As shown in FIG. 10, in the case where cells overlap each other, it can be seen that the color change of the image is greatly different, resulting in easy recognition. When FIG. 11 is converted to grayscale, the difficulty of resolution is greatly increased. Image morphology operation is performed, wherein a combination of one or more of corrosion operation and expansion operation is used; and the corrosion calculation and expansion calculation are, for example, calculation methods in the Chinese patent document CN106875404A. The erosion operation refers to corroding to remove the edges of the image, and aims to remove "burrs" on the edges of a target. The expansion operation refers to expanding the edges of the image, and aims to fill the edges or internal pits of the target image. The target image is made to be smoother by using the same number of times of corrosion and expansion. The results are shown in FIG. 17. Fine screening is performed according to the nuclear occupancy parameter to remove non-cells with a nuclear occupancy ratio below 0.3 and a nucleus radius above 150 pixels and below 10 pixels, wherein the nuclear occupancy ratio is obtained by dividing a nuclear area finely segmented according to the color difference threshold by a radius circle area of the detected feature point. The results are shown in FIG. 18, and the recognized images of each feature cell of the user are clearly displayed in a list, preferably, and are arranged in a positive-negative order to facilitate the doctor's diagnosis and assist the doctor to improve the diagnosis efficiency. Further preferably, during the operation, the coordinates of diagonal points of the resulting feature cell image are retained. For example, during the operation process, a coordinate operation record is retained in a form of a log, and the coordinate position of the feature cell image on the stitched image is retained so that the doctor can quickly browse the original image according to the coordinate position. Further preferably, unprocessed original sub-images can be quickly browsed according to the correspondence between the coordinates and the sub-images to prevent important cytopathological image features from being erased by intelligent operations and further determine the diagnostic accuracy.

Embodiment 6

Figure 21:
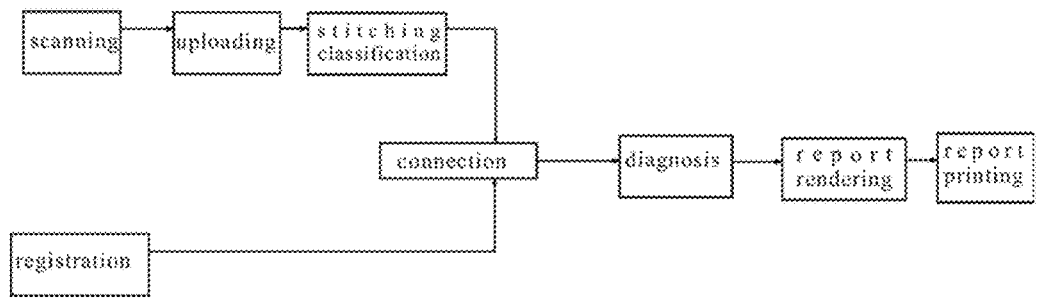
FIG. 21 is a flowchart of a method for cloud processing of an image in the present invention.

As shown in FIG. 21, a method for cloud processing of an image, that adopts the mobile phone-based miniature microscopic image acquisition device comprises the following implementation steps:

S1: numbering: numbering samples on the slide 7 to determine sample numbers in a cloud system. Samples of the slide 7 are acquired before the process on the cloud starts. After a batch of samples are acquired uniformly, they will be renumbered to determine the correspondence between the samples of the slide 7 and the information of a subject.

S2: registration: entering subject information corresponding to the slide 7 into the system and entering the sample number; and scanning: scanning images of the slide 7 with the mobile phone 11 to digitalize the samples. Registration and scanning are performed at the same time without interference. In the course of registering, the information of the subject is entered into the system, and the renumbered sample number is entered.

S3: uploading: uploading the scanned image samples to the cloud system. The cloud system provides a network-based data access service, which can store and recall various unstructured data files including text, pictures, audio, and video at any time through the network. Alibaba Cloud OSS uploads data files into a bucket in a form of objects, with rich SDK packages, and adapts to different computer languages for secondary development.

S4: stitching classification: processing the digital samples on cloud AI. The cloud AI performs a preliminary diagnosis on the digitized samples of the subject, and the sample of the subject at risk of disease is passed to step S6 for further diagnosis by the doctor.

S5: connection: associating the registration information with the digitalized sample information in the system. Associating the personal information of the subject with the sample information of the subject is convenient for returning an inspection report to the subject at the later stage, which is beneficial to the later collation and further research of the data at the same time.

S6: diagnosis: diagnosing and reviewing the image samples, and submitting a diagnosis opinion operation by a doctor. The subject who may have a risk of disease in the preliminary diagnosis by AI is diagnosed and reviewed by the doctor, which improves the accuracy of the diagnosis but greatly reduces the cost of diagnosis. The sampling mechanism completes the acquisition of cell specimen image information, and then passes the data to a cloud diagnosis platform via the Internet. The artificial intelligence will automatically complete the diagnosis, and the doctor only needs to review and confirm the results that are positive. Because positive cases are often in the minority, artificial intelligence cloud diagnosis can save a lot of manual labor.

S7: report rendering: polling the completely diagnosed data in the system by using a rendering program and rendering the data into PDF, JPG, WORD format files according to corresponding report templates thereof. The rendering program is used to render a web page according to the required report template, extract the required fields, call PDF, JPG, and WORD components, and generate PDF, JPG, and WORD format files. Reports may also be printed. The corresponding programs can be connected to a printer to print the reports in batches. The hospital can call a local printer driver through a system web interface, and print the reports in batches as needed. At the same time, the system can return an electronic report to the subject through the entered information.

Cloud processing of the images is achieved by the above steps.

The above embodiments are merely preferred technical solutions of the present invention and should not be construed as limiting the present invention. The embodiments and the features in the embodiments in the present application may be arbitrarily combined without conflicting with each other. The protection scope of the present invention should be subjected to the technical solution of claims, including equivalent replacement solutions of the technical features of the technical solutions described in the claims. That is, equivalent replacement improvements within this range are also included in the scope protection of the present invention.

What is claimed is:

1. A mobile phone-based miniature microscopic image acquisition device, comprising a support (4), wherein,
   a mobile phone fixing table (1) is provided on the support (4) and fixes a mobile phone (11);
   a microscope head (3) is provided below a camera of the mobile phone (11), a slide holder (5) is provided below' the microscope head (3), and a lighting source (8) is provided below the slide holder (5); and
   a scanning movement is performed between the slide holder (5) and the microscope head (3) along X axis and Y axis, and images of a slide (7) are collected into the, mobile phone (11),
   the microscope head (3) comprises a cantilever rod (32) mounted on the mobile phone fixing table (1), one end of the cantilever rod (32) is fixedly connected to the mobile phone fixing table (1), and a microscope lens is provided on the other end of the cantilever rod (32); and the microphone lens is located below the camera of the mobile phone (11),
   the mobile phone fixing table (1) is provided with a sunken stage (108) near the camera of the mobile phone (11), and the cantilever rod (32) is fixedly connected to the sunken stage (108) by a screw (107),
   the sunken stage (108) is provided with at least one positioning pin (106), a tip of the cantilever rod (32) is provided with a corresponding pin hole, and the positioning pin (106) is slidably connected to the pin hole, the screw (107) is in threaded connection with the cantilever rod (32), a tip of the screw (107) props against the sunken stage (108), a distance between the cantilever rod (32) and the sunken stage (108) is adjusted by rotation of the screw (107),
   the cantilever rod (32) has a shape bent from one side of the mobile phone fixing table (1) toward the camera.

2. The mobile phone-based miniature microscopic image acquisition device according to claim 1, wherein,
   the microscope lens is a replaceable microscope lens (31).

3. The mobile phone-based miniature microscopic image acquisition device according to claim 1, wherein,
   a magnification of the microscope lens is 2 to 10 times.

4. The mobile phone-based miniature microscopic image acquisition device according to claim 1, wherein,
   positioning blocks (2) are provided on both sides of the mobile phone fixing table (1), and are connected to the mobile phone fixing table (1) through fixing screws (12) and
   opposite surfaces of the two'positioning blocks (2) are inclined surfaces, and each of the positioning blocks (2) has a wider top and a narrower bottom so as to lock the mobile phone (11) by the inclined surfaces.

5. The mobile phone-based miniature microscopic image acquisition device according to claim 1, wherein,
   a magnetic attraction block (13) is provided on a surface of the mobile phone fixing table (1); or
   a positioning block (2) is provided on at least one side of the mobile phone fixing table (1), and a magnetic attraction block (13) is provided on a surface of the mobile phone fixing table (1); or
   a positioning block (2) is provided on at least one side of the mobile phone fixing table (1), and a silicone friction plate is provided on a suiface of the mobile phone fixing table (1).

6. The mobile phone-based miniature microscopic image acquisition device according to claim 1, wherein,
   the slide, holder (5) is provided on a scanning mechanism running along the X axis and Y axis;
   an X-axis guide rail (105) is fixedly provided on the support (4), and an X-axis, slider (102) is slidably mounted on the X-axis guide rail (105), an X-axis drive nut (103) is fixedly provided on the X-axis slider (102), an X-axis drive motor (10) is connected to an X-axis screw rod (101), the X-axis screw rod (101) is in threaded connection with the X-axis drive nut (103), so that the X-axis drive motor (10) drives the X-axis slider (102) to reciprocate along the X-axis guide rail (105);
   a Y-axis guide rail (104) is fixedly provided on the X-axis slider (102), the slide holder (5) is slidably mounted on the Y-axis guide rail (104), a Y-axis drive nut (53) is provided on the slide holder (5), a Y-axis drive motor (6) is connected to a Y-axis screw rod (54), the Y-axis screw rod (54) is in threaded connection with the Y-axis drive nut (53), so that the Y-axis drive motor (6) drives the slide holder (5) to reciprocate along the Y-axis guide rail (104);
   the mobile phone-based miniature microscopic image acquisition device is further provided with a control box (9), wherein the control box (9) outputs a switch signal to be connected to the mobile phone (11) to control the mobile phone to take pictures; and
   the control box (9) outputs pulse signals to be connected to the X-axis drive motor (10) and the Y-axis drive motor (6), respectively, to drive the X-axis drive motor (10) and the Y-axis drive motor (6) to rotate respectively.

7. The mobile phone-based miniature microscopic image acquisition device according to claim 6, wherein,
   the X-axis drive motor (10) and the Y-axis drive motor (6) are stepping motors; and
   the lighting source (8) is a light emitting diode power source.

8. An image stitching method adopting the mobile phone-based miniature microscopic image acquisition device according to claim 1, wherein,
   the device sends pictures to a server through a network,
   the server identifies an overlapping region between every two adjacent images and determine an adjacent positional relationship between sub-images, and the sub-images acquired by a microscopic scanning device are automatically arranged in a stitching order of the images;
   the server finely tunes positions according to an overlapping region between every two adjacent sub-images, and cell positions are accurately stitched;
   the server automatically extracts a completely stitched image;
   the image stitching method comprises the following implementation steps:
   S1 visual field sub-block matching: the server identifies an overlapping region between every two adjacent images and determine an adjacent positional relationship between the sub- images, and the sub-images acquired by the microscopic scanning device are automatically arranged in a stitching order of the images;

S2 visual field position fitting: the server finely tunes positions according to the overlapping region between every two adjacent sub-images, and cell positions are accurately stitched;

S3 block extraction: the server automatically extracts a completely stitched image;

an operating process of the visual field sub-block matching in step Si is as follows:

Sa01: inputting and initiating a result set M;
Sa02: setting, a current visual field i as a first visual field;
Sa03: solving a set J of all adjacent visual fields of the current visual field i;
Sa04: setting a current adjacent visual field j as a first visual field in J;
Sa05: solving possible overlapping regions Ri and Rj of the visual field i and the visual field j;
Sa06: rasterizing a template region Ri into template sub-block sets Pi;
Sa07: sorting the template sub-block sets Pi in a descending order according to a dynamic range of sub-blocks;
Sa08: setting a current template sub-block P as first one in the template sub-block sets Pi;
Sa09: solving a possible overlapping region s of the template sub-block P in the visual field J;
Sa10: performing a template matching search by taking, the template sub-block P as a template and s as a search, region;
Sa11: adding a best match .m to the result set M;
Sa12: finding all matching visual field sets N that are in consistent with in from the result set M;
Sa13: judging vhether or not a weight, in N is greater than a threshold v upon comparison;
if not, setting the current template sub-block P as next one in the template sub-block sets Pi and returning to Sa09;
if yes, proceeding to next step;
Sa14: judging whether or not the visual field j is last visual field in the visual field set J upon comparison;
if not, setting the visual field j as the next visual field in the visual field set J and returning to Sa05;
if yes, proceeding to next step;
Sa15: judging whether or not the visual field i is last visual field upon comparison;
if not, setting i as next visual field and returning to Sa03;
if yes, outputting a result;

a process of visual field position fitting in step S2 is as follows:

Sa16: inputting and initializing all visual field positions Xi, Yi;
Sa17: setting current visual field i as a first visual field;
Sa18: obtaining a matching subset Mi including the visual field i from the sub block matching set M;
Sa19: recalculating positions Xi and Yi of the visual field i according to the matching subset Mi;
Sa20: judging whether or not all visual field updates are completed;
if not, setting the visual field i as next visual field;
if yes, proceeding to next step:
Sa21: calculating an average deviation L between a current visual field position and a previous visual field position;
Sa22: judging whether or not an average deviation L is less than a threshold value 1 upon comparison;
if not, returning to Sa17;
if yes, proceeding to next. step:
Sa23: performing normalized adjustment on the visual field positions;
outputting all the visual fields;

a process of block extraction in step S3 is as follows:
Sa24: extracting sizes W, H of a full graph;
Sa25: dividing the full graph into a set B of blocks according to block sizes;
Sa26: calculating positions of all blocks b in the set B;
Sa27: setting one of the blocks b as first block, in the set B;
Sa28: calculating a set Fb of all visual fields overlapping with the block b;
Sa29: setting a visual field f as first visual field in Fb;
Sa30: solving overlapping regions Rb and Rf of the visual field f and the block b;
Sa31: copying an image in Rf to Rb;
Sa32: judging whether or not the visual field f is last visual field in the set Fb;
if not, setting the visual field f as next visual field in Fb and returning to Sa29;
if yes, proceeding to, next step;
Sa33: saving an image of the block b;
Sa34: judging whether or not the block b is the last block in the set B;
if not, setting the block b as a first block in the set B and returning to Sa28: and
if yes, outputting a result.

9. An image recognition method adopting the mobile phone-based miniature microscopic image acquisition device according to claim 1, comprising the following steps:
S1: acquiring microscopic images;
S2: stitching a plurality of images of a single sample, and extracting according to cell nucleus features in the stitched image to obtain microscopic images of single cell nucleus;
S3: classifying the microscopic images of single cell nucleus according to labeled cells by an artificial intelligence program subjected to model training;
thereby obtaining sample-based classified cell data through above steps; wherein
a step of acquiring the microscopic image of single cell nucleus in step S2 is as follows:
S100: detecting features points of the cell nucleus:
reducing each image to a plurality of different scales and extracting feature points respectively;
S101: performing preliminary screening, i.e., screening to remove feature points that are too close by using coordinates of the feature points, thereby reducing repeated extraction of cells;
S102: subdividing and segmenting according to a color difference threshold:
converting a picture to a LAB format which is a format of lightness, channel a and channel b, and after an inversion of a B channel as well as the weighting and Otsu thresholding of an A channel, segmenting to obtain a cell nucleus mask map, wherein a weight is 0.7 for the B channel under the inversion and 0.3 for the A channel;
S103: performing image morphology operation:
a combination of one or more of corrosion operation and expansion operation; and
S104: performing fine screening according to a nuclear occupancy parameter to remove non-cells each having a nuclear occupancy ratio below 0.3 and a nucleus radius above 150 pixels and below 10 pixels, wherein the nuclear occupancy ratio is obtained by dividing a nuclear area finely segmented according to a color difference threshold by a radius circle area of the detected feature point.

10. A method for cloud processing of an image by adopting the mobile phone-based miniature microscopic image acquisition device according to claim 1, comprising the following steps:
- S1 numbering: numbering samples on the slide (7) to determine sample numbers in a cloud system;
- S2 registration: entering subject information corresponding to the slide (7) into the system and entering the sample numbers;
- scanning: scanning images of the slide (7) with the mobile phone (11);
- S3 uploading: uploading scanned image samples to the cloud system;
- S4 stitching classification: processing digital samples on cloud Artificial Intelligence;
- S5 connection: associating registration information with the digital sample information in the system;
- S6 diagnosis: diagnosing and reviewing the image samples, and submitting a diagnosis opinion operation by a doctor;
- S7 report rendering: polling completely diagnosed data in the system by using a rendering program and rendering the data into Portable Document format, Joint Photographic Experts Group format, Microsoft Word file format files according to corresponding report templates thereof;
- thereby achieving cloud processing of the images through above steps.

* * * * *